(12) United States Patent
Mori

(10) Patent No.: US 11,644,559 B2
(45) Date of Patent: May 9, 2023

(54) RADAR APPARATUS, AND TRANSMISSION AND RECEPTION METHOD

(71) Applicant: KABUSHIKI KAISHA TOSHIBA, Tokyo (JP)

(72) Inventor: Hiroki Mori, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 229 days.

(21) Appl. No.: 17/016,967

(22) Filed: Sep. 10, 2020

(65) Prior Publication Data

US 2021/0278519 A1 Sep. 9, 2021

(30) Foreign Application Priority Data

Mar. 5, 2020 (JP) .............................. JP2020-038014

(51) Int. Cl.
*G01S 13/48* (2006.01)
*H01Q 21/06* (2006.01)
*G01S 7/03* (2006.01)

(52) U.S. Cl.
CPC .............. *G01S 13/48* (2013.01); *G01S 7/032* (2013.01); *H01Q 21/061* (2013.01)

(58) Field of Classification Search
CPC .......... G01S 13/42; G01S 13/48; G01S 7/032; H01Q 21/061
See application file for complete search history.

(56) References Cited

U.S. PATENT DOCUMENTS

| 9,869,762 | B1* | 1/2018 | Alland | H01Q 21/08 |
| 2013/0162475 | A1 | 6/2013 | Blech et al. | |
| 2016/0285172 | A1 | 9/2016 | Kishigami et al. | |
| 2017/0082730 | A1 | 3/2017 | Kishigami et al. | |
| 2019/0313937 | A1* | 10/2019 | Fhager | A61B 5/05 |
| 2020/0161775 | A1 | 5/2020 | Zhu et al. | |
| 2020/0321710 | A1* | 10/2020 | Shtrom | H04B 7/08 |
| 2020/0355789 | A1* | 11/2020 | Kitamura | H01Q 21/08 |

(Continued)

FOREIGN PATENT DOCUMENTS

| JP | 2016180720 A | 10/2016 |
| JP | 2017058359 A | 3/2017 |
| JP | 6396244 B2 | 9/2018 |

OTHER PUBLICATIONS

Li, et al., "MIMO Radar: Concepts, Performance Enhancements, and Applications", in MIMO Radar Signal Processing, 2009, pp. 74-77.

(Continued)

*Primary Examiner* — Timothy X Pham

(74) *Attorney, Agent, or Firm* — Holtz, Holtz & Volek PC

(57) ABSTRACT

According to one embodiment, a radar apparatus includes first antennas, a second antenna, and a third antenna. If the first antennas are used as transmission antennas, the second and third antennas are used as reception antennas. If the second and third antennas are used as the transmission antennas, the first antennas are used as the reception antennas. The first antennas are arranged in a first direction at a first distance and in a second direction crossing the first direction at a second distance. A distance between the second antenna and the third antenna in the first direction is approximately equal to a product of the first distance and a number of first antennas arranged in the first direction.

18 Claims, 22 Drawing Sheets

(56) References Cited

U.S. PATENT DOCUMENTS

2022/0050176 A1* 2/2022 Kishigami .............. G01S 7/032
2022/0283281 A1* 9/2022 Ishikawa ................ H01Q 21/06

OTHER PUBLICATIONS

Moffet, "Minimum-Redundancy Linear Arrays", IEEE Transactions on Antennas and Propagation (vol. AP-16, No. 2), Mar. 1968, pp. 172-175.
U.S. Appl. No. 16/807,354 First Named Inventor: Haruka Obata Title: System and Inspection Method; filed Mar. 3, 2020.
U.S. Appl. No. 17/016,237 First Named Inventor: Hiroki Mori; Title: "Antenna Device"; filed Sep. 9, 2020.

* cited by examiner

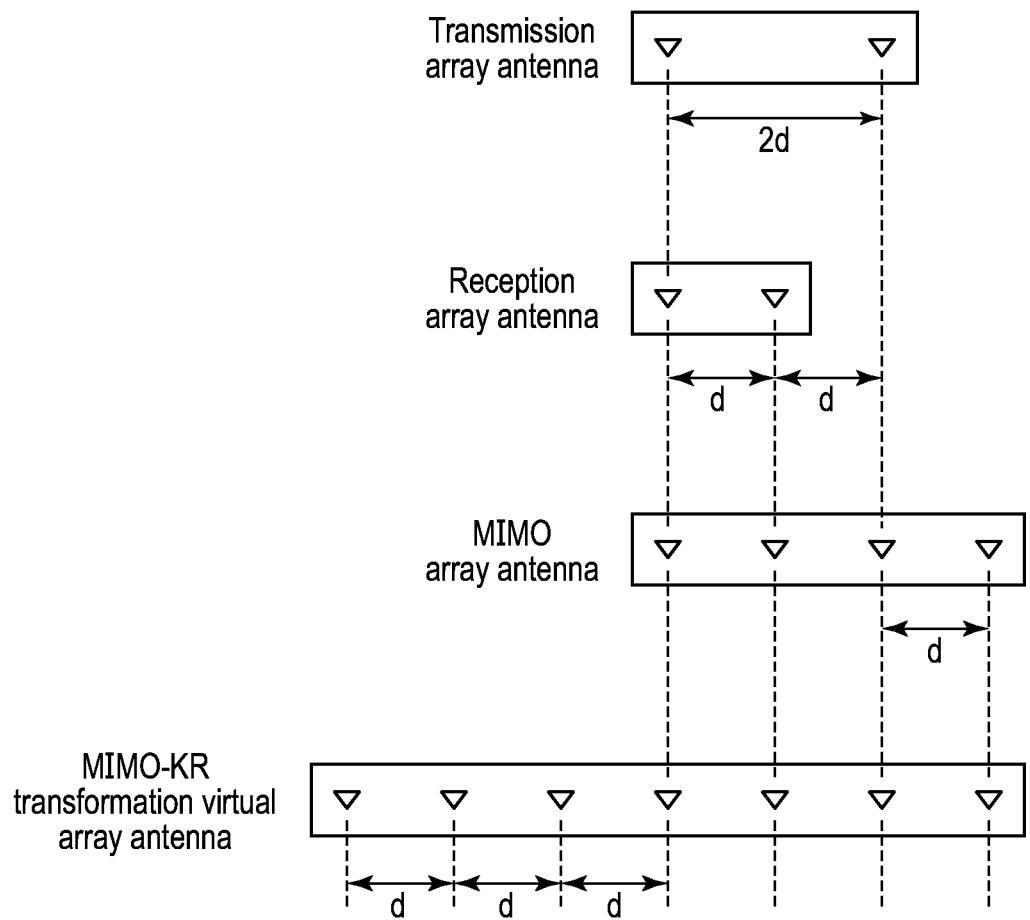
F I G. 3

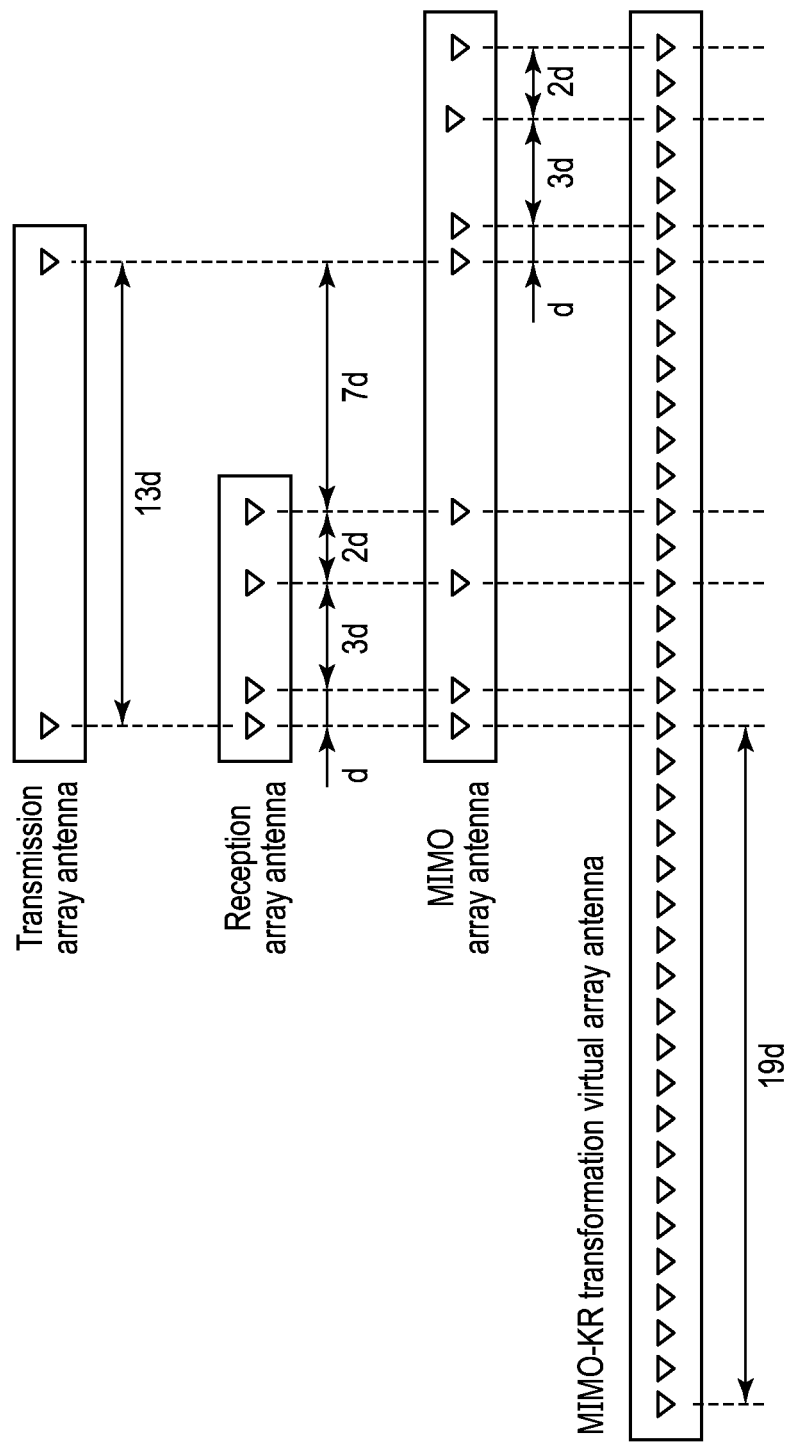
F I G. 5

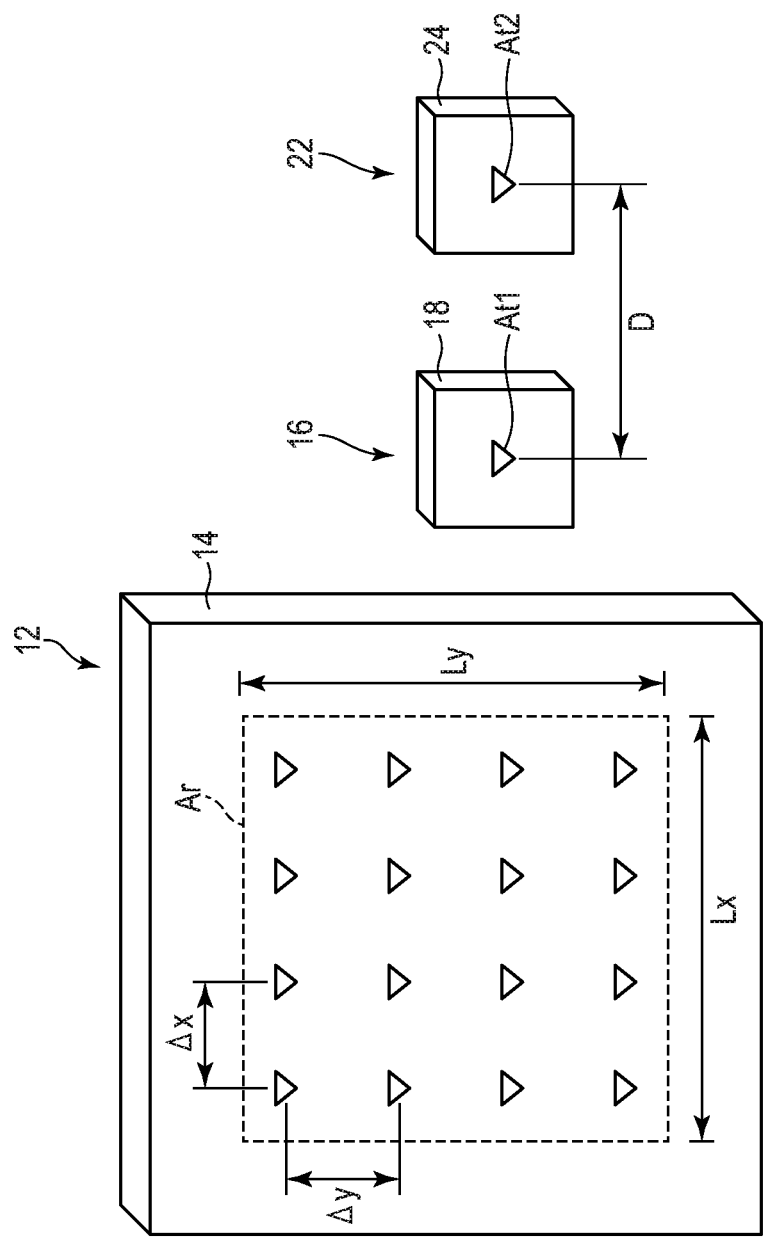

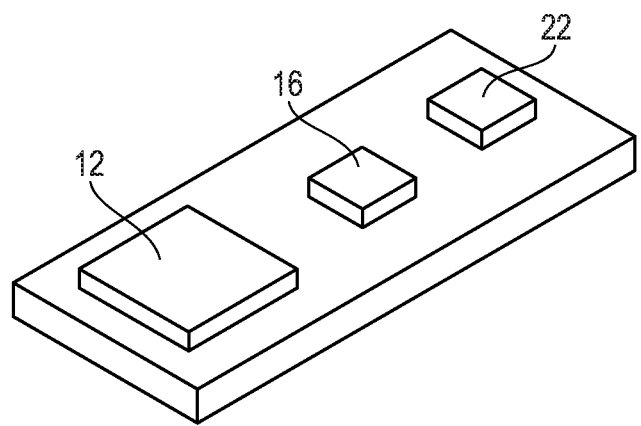
F I G. 7A
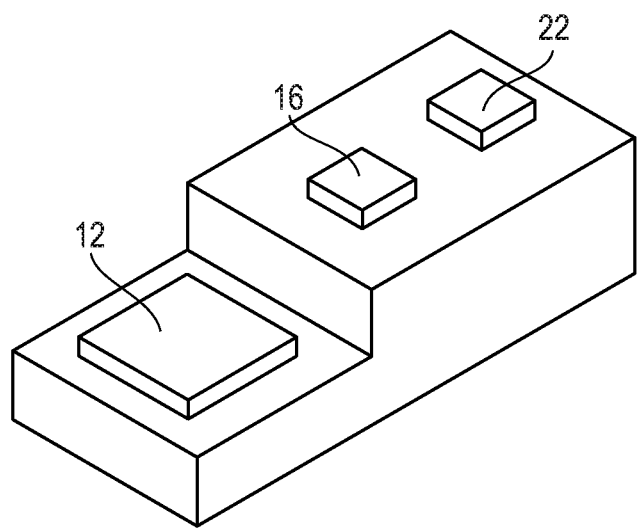
F I G. 7B

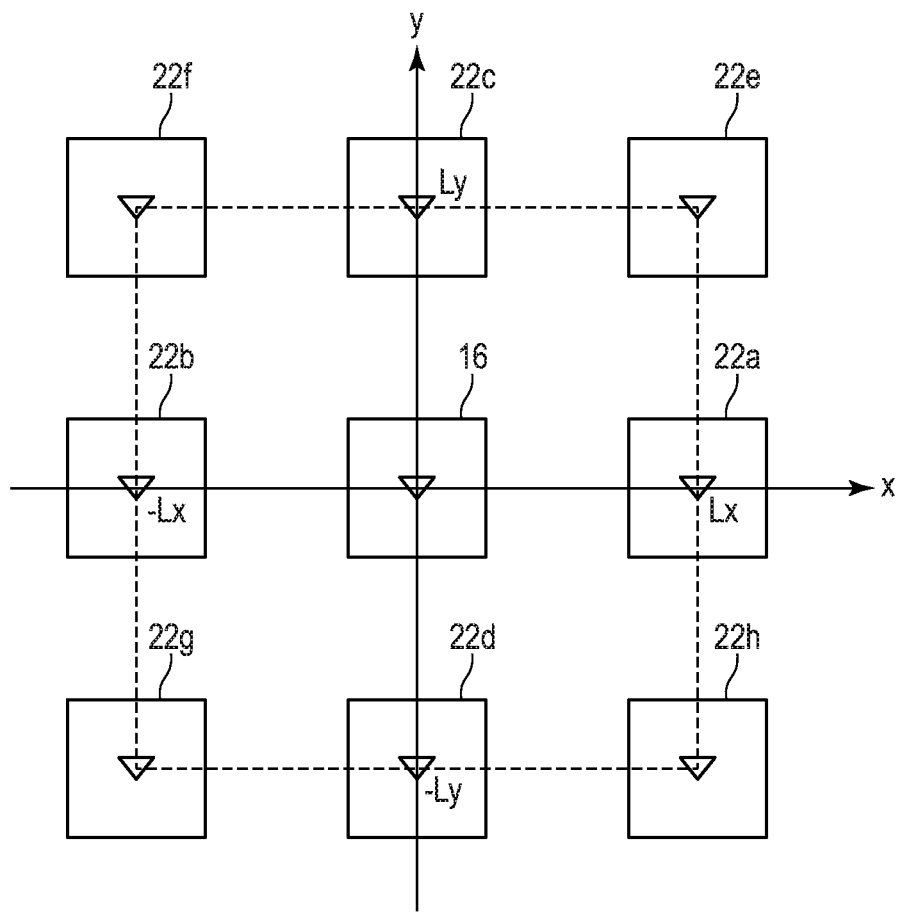
F I G. 8

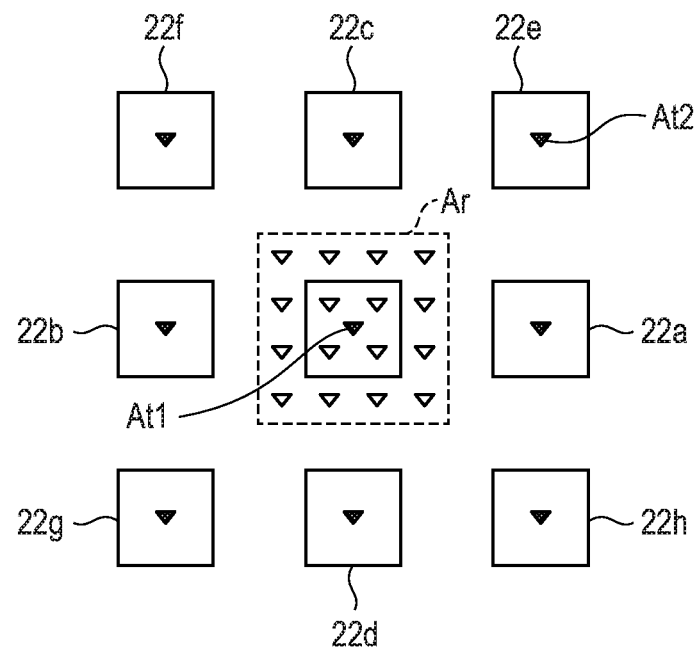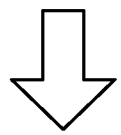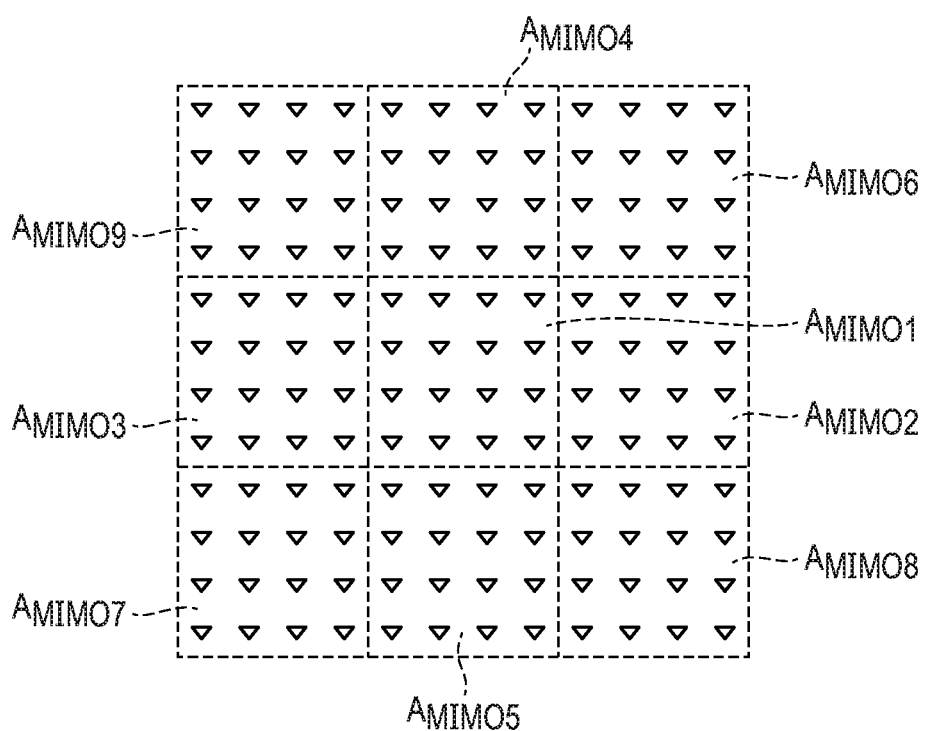
FIG. 11

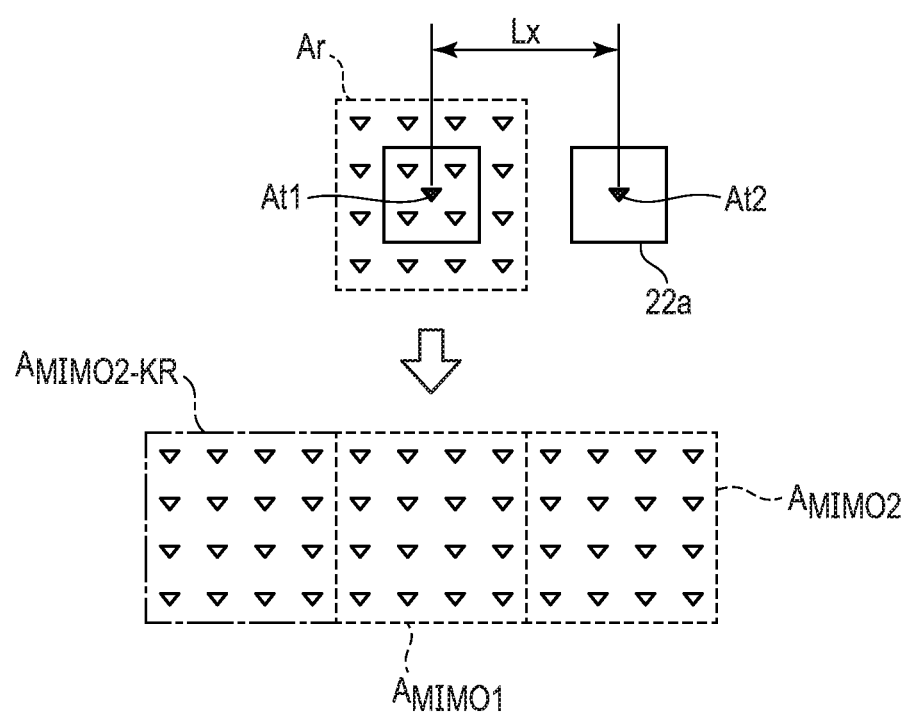
F I G. 12

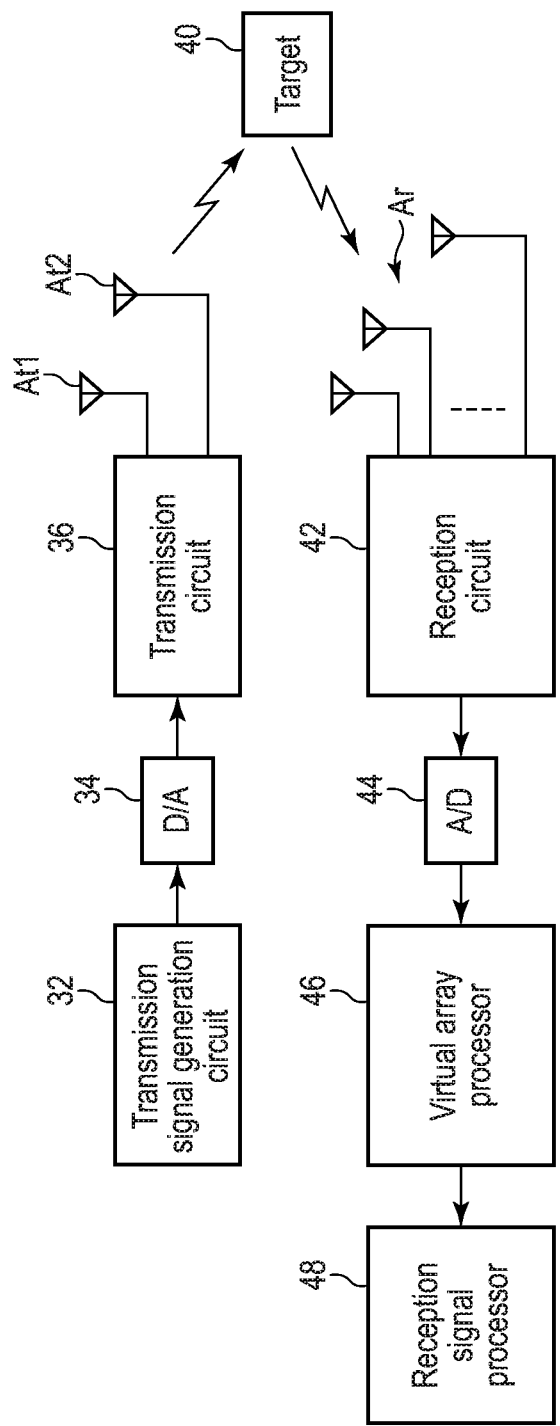
F I G. 15

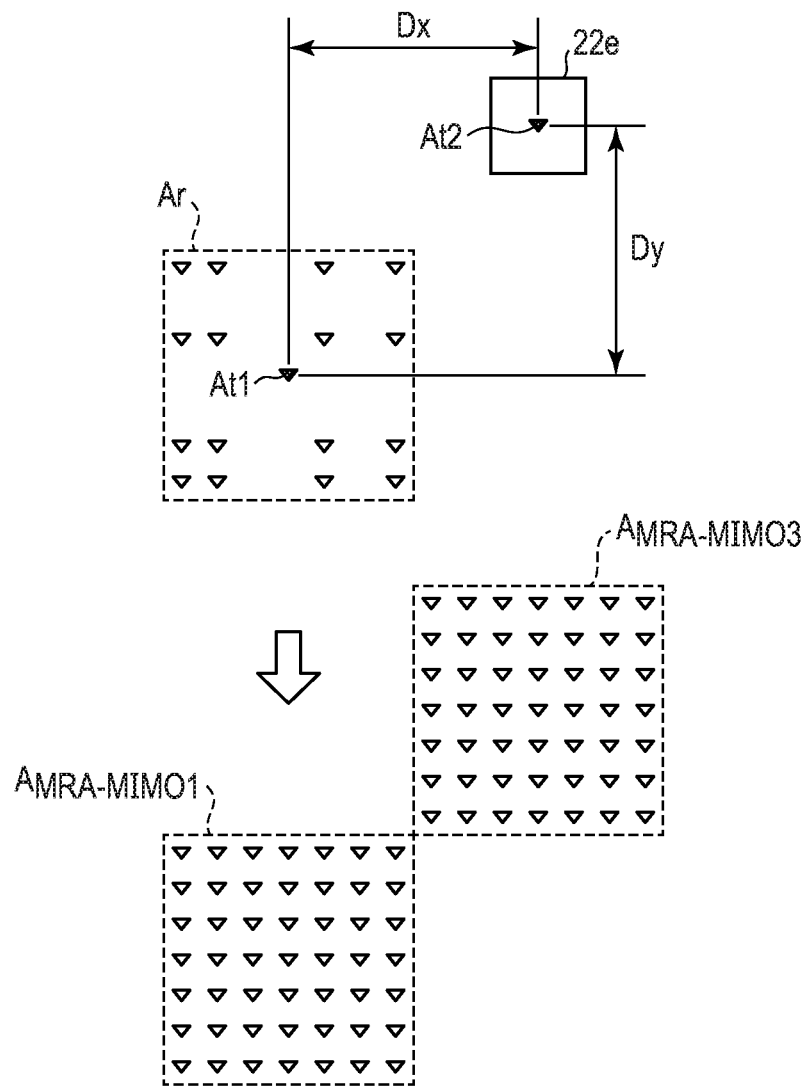
F I G. 18

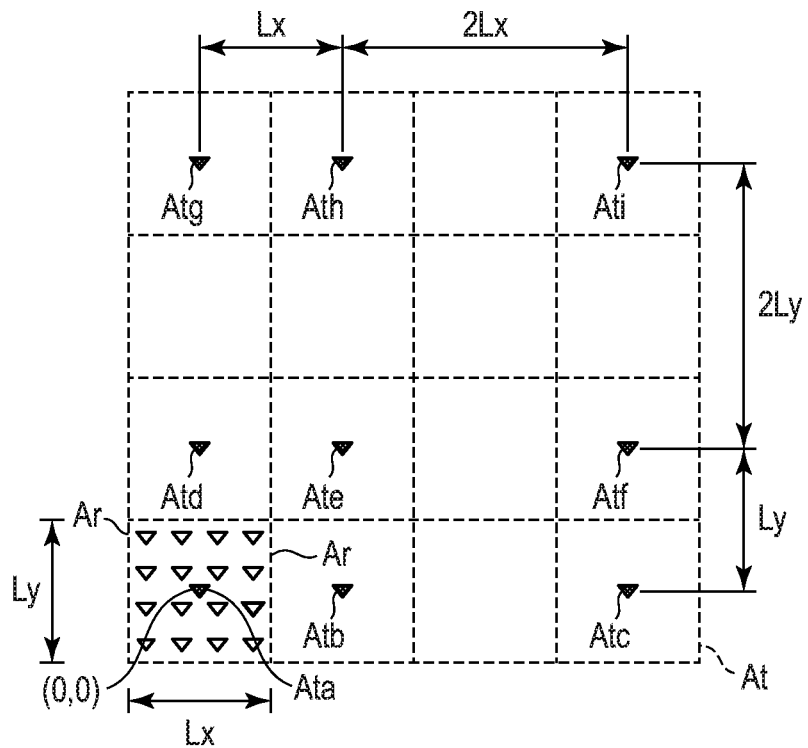
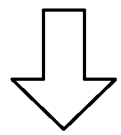
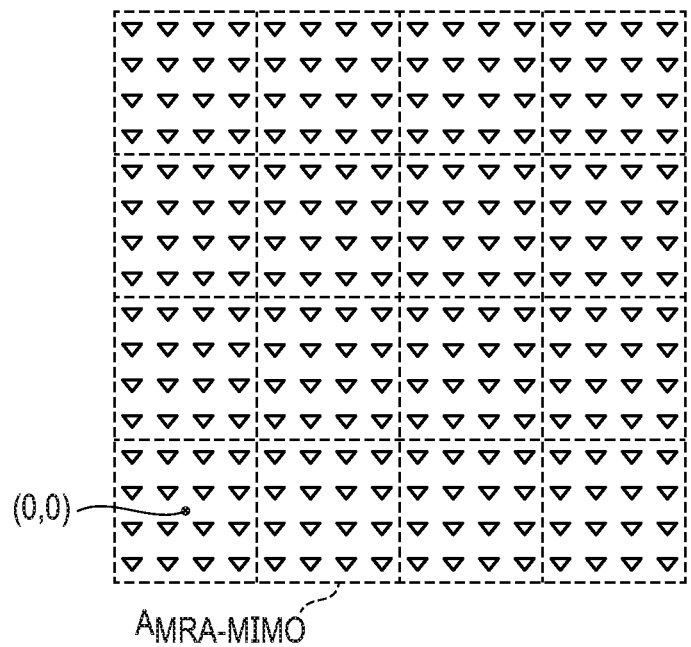
FIG. 22

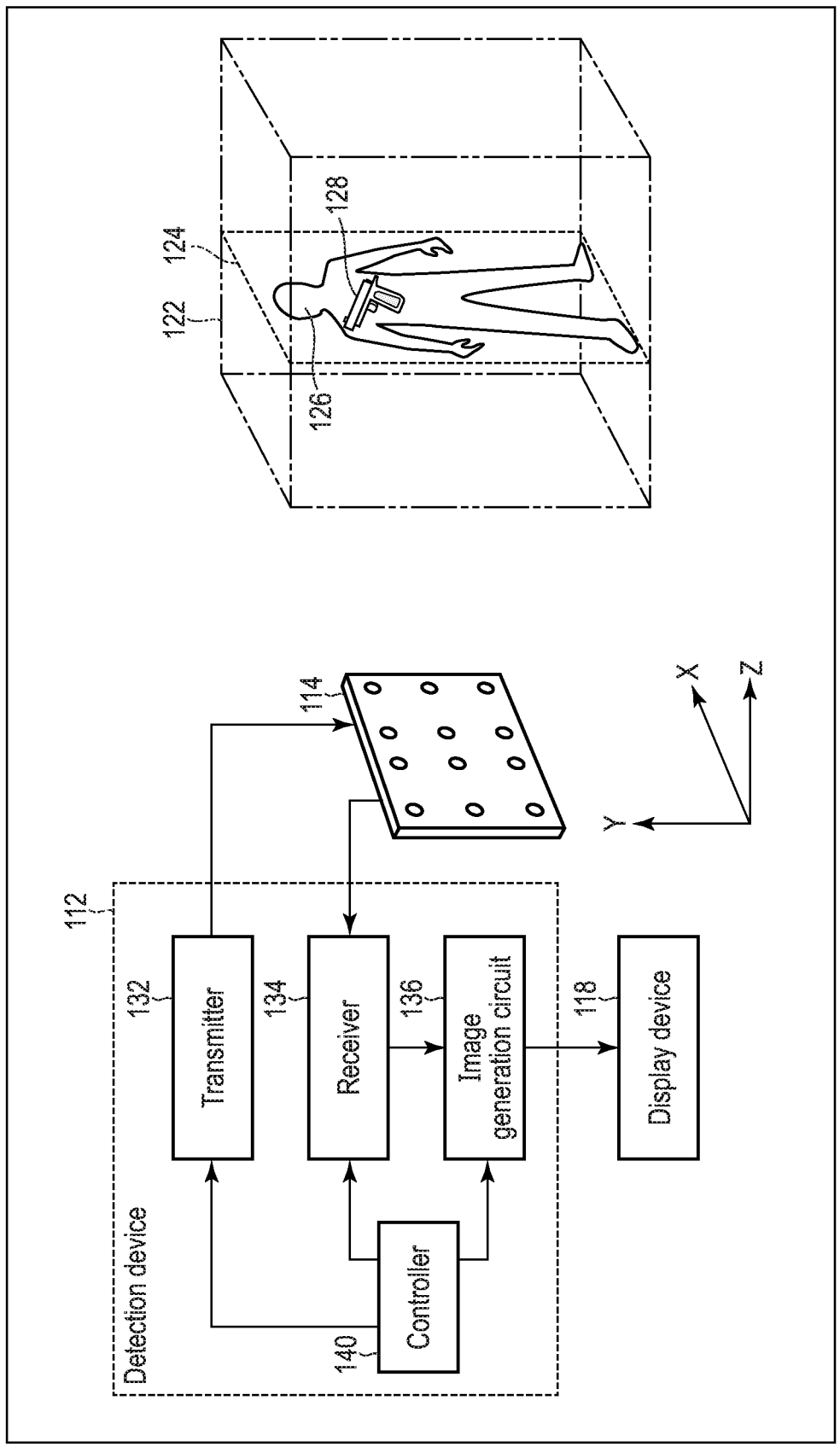
F I G. 24

RADAR APPARATUS, AND TRANSMISSION AND RECEPTION METHOD

CROSS-REFERENCE TO RELATED APPLICATIONS

This application is based upon and claims the benefit of priority from Japanese Patent Application No. 2020-038014, filed Mar. 5, 2020, the entire contents of which are incorporated herein by reference.

FIELD

Embodiments described herein relate generally to a radar apparatus that applies virtual array technology, and a transmission and reception method.

BACKGROUND

The radar system for target direction estimation must have good angular resolution. In order to improve the angular resolution of the radar system, the antenna aperture needs to be widened. Since the antenna aperture depends on the number of antennas, to widen the antenna aperture, the number of antennas is increased. However, increasing the number of antennas is limited by cost and location factors.

Instead of actually increasing the number of antennas, Multi-Input Multi-Output (MIMO) radar system has been developed.

BRIEF DESCRIPTION OF THE DRAWINGS

FIG. 3 illustrates an example of a MIMO-KR (Khatri-Rao) transformation virtual array antenna in the radar system according to the embodiment.

FIG. 5 illustrates another example of the MIMO-KR transformation virtual array antenna in the radar system according to the embodiment.

FIGS. 6A and 6B illustrate structural examples of a reception antenna module and first and second transmission antenna modules according to a first embodiment.

FIGS. 7A and 7B illustrate examples of an arrangement of the first and second transmission antenna modules and the reception antenna module according to the first embodiment.

FIG. 8 illustrates an example of an arrangement of the first and second transmission antenna modules according to the first embodiment.

FIG. 11 illustrates another example of the MIMO array antenna according to the first embodiment.

FIG. 12 illustrates an example of a virtual array antenna according to a second embodiment.

FIG. 15 is a block diagram of an example of the radar apparatus according to the second embodiment.

FIG. 18 illustrates another example of the virtual array antenna according to the third embodiment.

FIG. 22 illustrates an example of a virtual array antenna according to a fourth embodiment.

FIG. 24 illustrates an application of the radar system according to an embodiment.

DETAILED DESCRIPTION

Figure 1:
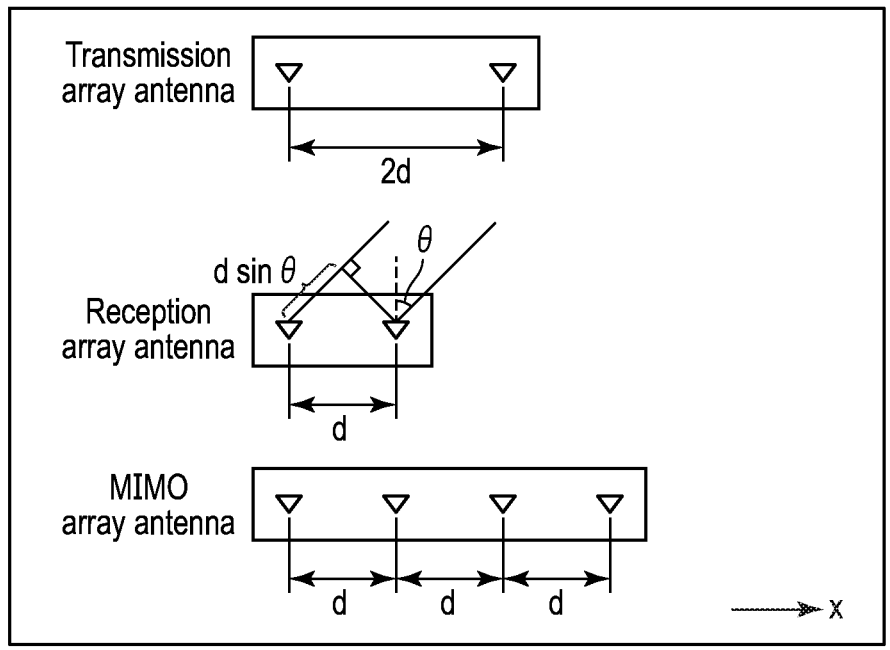
FIG. 1 illustrates an example of a MIMO array antenna in a radar system according to an embodiment.

The embodiments will be described below with reference to the drawings. The following description is an example of an apparatus or method for embodying a technical idea of an embodiment. The technical philosophy of the embodiment is not limited to the structure, shape, arrangement, materials, etc., of the components described below. Variations that are readily apparent to those skilled in the art are naturally included within the scope of the disclosure. For the sake of clarity, the drawings show the size, thickness, flat dimensions or shape of each element as actual. The drawings may be modified and schematically represented against the implementation of the In more than one drawing, elements may be included that have different dimensional relationships and proportions to each other. In multiple drawings, corresponding elements may be marked with the same reference numeral to omit duplicate explanations. Some elements may be called by multiple names. Although some elements may be given multiple designations, these designations are for illustrative purposes only. These elements may be called by other names. This does not preclude giving other names to these elements even when they are not given multiple designations. In the following explanation, "connection" means not only direct connection but also connection through other elements.

In general, according to one embodiment, a radar apparatus includes first antennas arranged in a first plane, a second antenna, and a third antenna. If the first antennas are used as transmission antennas, the second antenna and the third antenna are used as reception antennas. If the second antenna and the third antenna are used as the transmission antennas, the first antennas are used as the reception antennas. The first antennas are arranged in a first direction at a first distance and in a second direction crossing the first direction at a second distance. A distance between the second antenna and the third antenna in the first direction is approximately equal to a product of the first distance and a number of first antennas arranged in the first direction.

First Embodiment

Before describing the embodiments, a MIMO array antenna according to a MIMO radar, a virtual array antenna according to KR transformation, and a virtual array antenna according to a minimum redundancy array (MRA) will be explained.

FIG. 1 illustrates an example of a MIMO array antenna formed of a transmission array antenna and a reception array antenna. The transmission array antenna includes Ntx (in this case, two) transmission antennas. The reception array antenna includes Nrx (in this case, two) reception antennas. The MIMO array antenna includes four reception antennas.

The two transmission antennas are arranged in the x-axis direction at a distance of 2d to form a transmission array antenna of a uniform linear array (ULA). The two reception antennas are arranged in the x-axis direction at a distance d to form a reception array antenna of the ULA. An example of the distance d is approximately half of the wavelength λ (half-wavelength: λ/2) of the highest intensity wave in radio waves transmitted from the transmission array antenna. The number of targets to estimate a direction is K. The radio waves respectively arrive from the targets. A total of K radio waves arrive.

Since the transmission antenna and the reception antenna are interchangeable, in the following description, the transmission antenna may be referred to as the reception antenna, and the reception antenna may be referred to as the transmission antenna. Similarly, the transmission array antenna may be referred to as the reception array antenna, and the reception array antenna may be referred to as the transmission array antenna.

In the MIMO radar, the reception data x(t) at a given time t is modeled as in Equation 1.

$$x(t) = As(t) + n(t) \quad \text{Equation 1}$$
$$= \sum_{k=1}^{K} a_t(\theta_k) \otimes a_r(\theta_k) s_k + n(t)$$

Here, A is the mode matrix,
s(t) is the complex amplitude vector of the reception signal at time t,
n(t) is the noise vector at time t, $\theta_k$ is the direction of arrival of the radio wave from the k-th target,
$a_t(\theta_k)$ is the mode vector of the transmission array antenna for any k, and
$a_r(\theta_k)$ is the mode vector of the reception array antenna for any k.
⊗ is the Kronecker product.
If $a_t(\theta_k) \otimes a_r(\theta_k)$ is the mode vector $a(\theta_k)$
of the MIMO array antenna for any k,
Equation 2 is obtained.

$$a(\theta_k) = a_t(\theta_k) \otimes a_r(\theta_k) \quad \text{Equation 2}$$
$$= \left[1, e^{j(2\pi/\lambda)2d \sin\theta_k}\right]^T \otimes \left[1, e^{j(2\pi/\lambda)d \sin\theta_k}\right]^T$$

When $\phi_k = j(2\pi/\lambda)d \times \sin\theta_k$, the mode vector of the MIMO array antenna for any k is expressed as Equation 3.

$$a(\theta_k) = \left[1, e^{2\phi k}\right]^T \otimes \left[1, e^{\phi k}\right]^T \quad \text{Equation 3}$$
$$= \left[1, e^{\phi k}, e^{2\phi k}, e^{3\phi k}\right]$$

Since Equation 3 contains four phase states of 0, $\phi_k$, $2\phi_k$, and $3\phi_k$, it is understood that a MIMO array antenna including four (=Ntx×Nrx) antennas is formed based on the two transmission antennas and the two reception antennas. The four antennas are arranged in the x-axis direction at a distance d.

Figure 2:
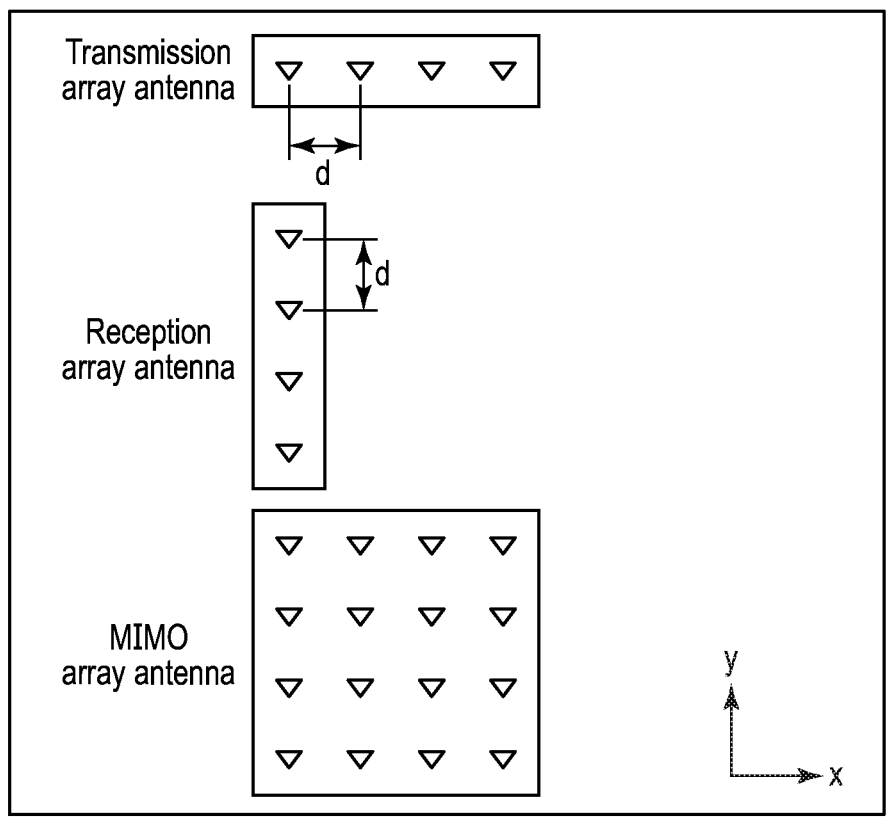
FIG. 2 illustrates another example of the MIMO array antenna in the radar system according to the embodiment.

FIG. 1 shows an example in which the antennas forming the transmission array antenna and the antennas forming the reception array antenna are arranged in the same direction (here, x-axis direction). FIG. 2 shows an example including a transmission array antenna of the ULA and a reception array antenna of the ULA. The transmission array antenna of the ULA includes Ntx (in this case, four) transmission antennas arranged in the x-axis direction at a distance d. The reception array antenna of the ULA includes Nry (in this case, four) reception antennas arranged in the y-axis direction at a distance. In the example of FIG. 2, a MIMO array antenna including sixteen (=Ntx×Nrx) antennas is formed.

Equation 3 indicates that a MIMO array antenna can be formed. When the KR transformation is applied for the reception signal x(t), virtual array antennas including more antennas can be formed. The KR transformation is a signal process to expand the dimensions of the mode vector of the MIMO array antenna using non-overlapping elements of the correlation matrix.

The correlation matrix Rxx using the reception signal x(t) is calculated as follows.

$$R_{xx} = E\left[x(t) \times (t)^H\right] \quad \text{Equation 4}$$
$$= ASA^H + RN$$

E[•] denotes ensemble mean. [•]H denotes Hermit transposition. S and RN denote the wave source correlation matrix and the noise correlation matrix, respectively. When the power of the signal source is assumed to be 1, S=1. When the noise is assumed to be negligible, RN=0. Equation 5 is obtained in the example in FIG. 1.

$$R_{xx} = ASA^H \quad \text{Equation 5}$$
$$= a(\theta_k)a(\theta_k)^H$$
$$= \begin{bmatrix} 1 & e^{-\phi}k & e^{-2\phi}k & e^{-3\phi}k \\ e^{\phi}k & 1 & e^{-\phi}k & e^{-2\phi}k \\ e^{2\phi}k & e^{\phi}k & 1 & e^{-\phi}k \\ e^{3\phi}k & e^{2\phi}k & e^{\phi}k & 1 \end{bmatrix}$$

Here, $z_e$ is defined as a vector that contains only non-overlapping elements in the correlation matrix Rxx.

$$z_e = [e^{-3\phi k}, e^{-2\phi k}, e^{-\phi k}, 1, e^{\phi k}, e^{2\phi k}, e^{3\phi k}]^T \quad \text{Equation 6}$$

Since Equation 6 contains seven phase states of 0, $\pm\phi_k$, $\pm 2\phi_k$, and $\pm 3\phi_k$, it is understood that a MIMO-KR transformation virtual array antenna including seven (=2×Ntx×Nrx−1) virtual antennas is formed based on the two transmission antennas and the two reception antennas of FIG. 1. The virtual antennas are arranged in the x-axis direction at intervals of the distance d. As shown in Equations 4 to 6, obtaining the correlation matrix of the reception signal and obtaining the vector $z_e$ of the non-overlapping elements will be called the KR transformation.

FIG. 3 shows an example of a MIMO-KR transformation virtual array antenna.

The correlation matrix shown in Equation 5 still includes overlapping elements. It is understood that the efficiency of formation of the virtual array antenna by KR transformation can be improved.

Overlapping elements can be reduced if an MRA array antenna which reduces overlapping elements is used instead of the array antenna of the ULA as the transmission array antenna and the reception array antenna.

Figure 4:
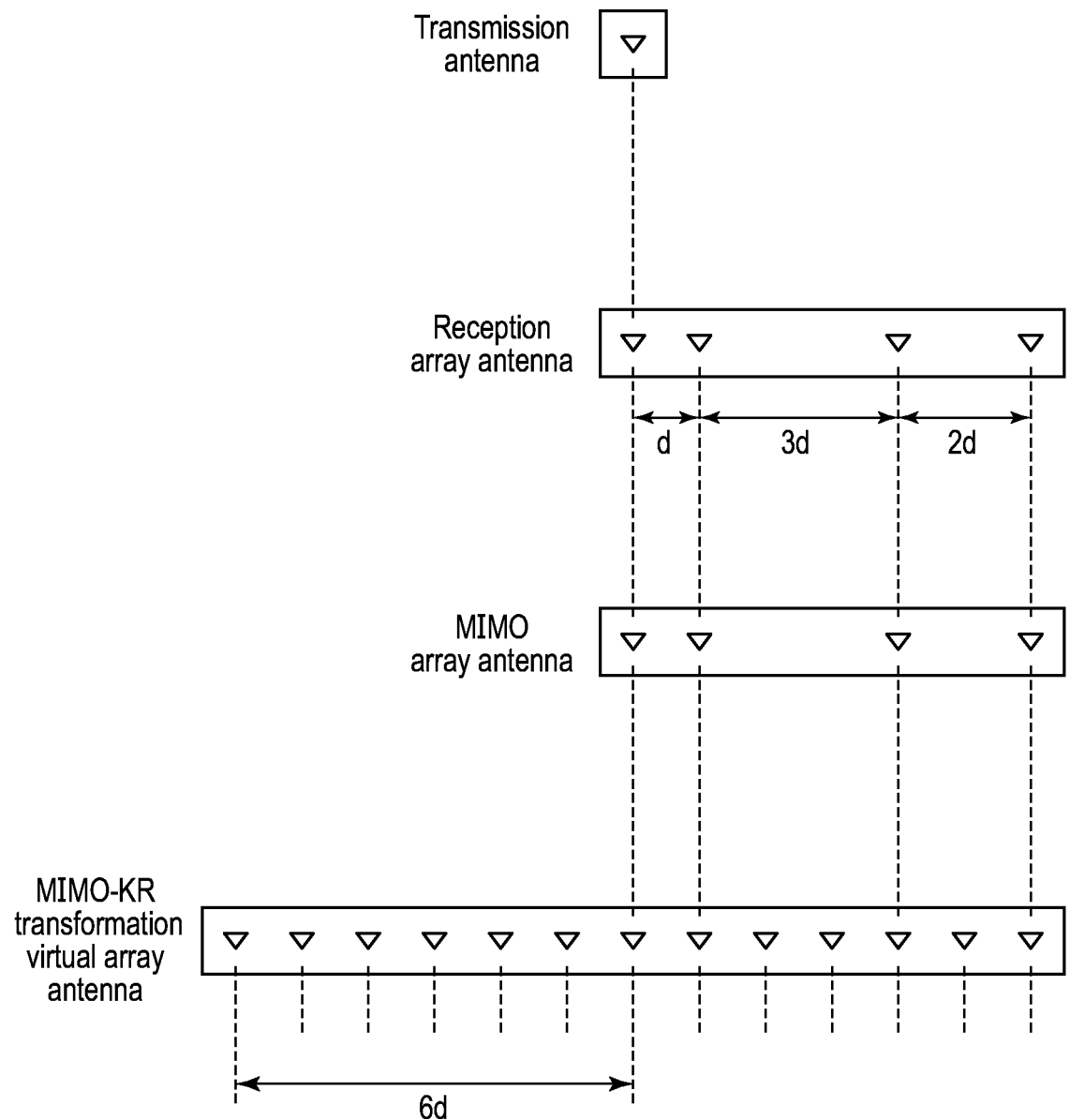
FIG. 4 illustrates another example of the MIMO-KR transformation virtual array antenna in the radar system according to the embodiment.

FIG. 4 shows an example of a MIMO-KR transformation virtual array antenna formed of a transmission antenna and a reception array antenna of the MRA including four reception antennas. The mode vector $a(\theta_k)$ of the virtual array antenna for any k and the correlation matrix $R_{XX}$ are expressed as follows.

$$a(\theta_k) = a_t(\theta_k) \otimes a_r(\theta_k) \quad \text{Equation 7}$$
$$= [1, e^{\phi}k, e^{4\phi}k, e^{6\phi}k]^T$$

$$R_{xx} = a(\theta_k)a(\theta_k)^H \quad \text{Equation 8}$$
$$= \begin{bmatrix} 1 & e^{-\phi}k & e^{-4\phi}k & e^{-6\phi}k \\ e^{\phi}k & 1 & e^{-3\phi}k & e^{-5\phi}k \\ e^{4\phi}k & e^{3\phi}k & 1 & e^{-2\phi}k \\ e^{6\phi}k & e^{5\phi}k & e^{2\phi}k & 1 \end{bmatrix}$$

Since Equation 8 does not include overlapping elements in the non-diagonal elements, it is understood that the MIMO-KR transformation virtual array antenna can be formed efficiently when the MRA array antenna is used. Since the number of non-overlapping elements in Equation 8 is 13, it is understood from Equation 8 that the MIMO-KR transformation virtual array antenna can be formed based on the MRA reception array antenna and one transmission antenna. The MRA reception array antenna includes four reception antennas. The MIMO-KR transformation virtual array antenna includes thirteen virtual antennas.

FIG. 5 shows an example of a MIMO-KR transformation virtual array antenna formed of a transmission array antenna including two transmission antennas and a reception array antenna of the MRA including four reception antennas. The mode vector a(θk) of the MIMO array antenna for any k is expressed as follows.

$$a(\theta_k) = a_t(\theta_k) \otimes a_r(\theta_k) \quad \text{Equation 9}$$
$$= [1, e^{13\phi}k] \otimes [1, e^{\phi}k, e^{4\phi}k, e^{6\phi}k]$$
$$= [1, e^{\phi}k, e^{4\phi}k, e^{6\phi}k, e^{13\phi}k, e^{14\phi}k, e^{17\phi}k, e^{19\phi}k]$$

Since the number of non-overlapping elements of the correlation matrix is 39, it is understood from Equation 9 that the MIMO-KR transformation virtual array antenna including thirty-nine virtual antennas can be formed based on the transmission array antenna including two transmission antennas and the MRA reception array antenna including four reception antennas.

From the above, it is understood that the virtual array antenna can be formed efficiently with the MIMO-KR transformation, and the number of antennas can be increased efficiently if the MRA array antenna is used instead of the array antenna of the ULA.

FIGS. 6A and 6B show an example of a radar apparatus according to a first embodiment. The radar apparatus includes one reception antenna module 12 shown in FIG. 6A and at least two reception antenna modules 16 and 22 shown in FIG. 6B. The radar apparatus may include one transmission antenna module shown in FIG. 6A and at least two reception antenna modules shown in FIG. 6B. Each antenna module includes a square, e.g., a rectangular, flat plate substrate and one or more antennas formed on the substrate. There is no restriction on the type of antenna. The antenna may be a linear antenna, a planar antenna, a flat antenna, a patch antenna, or a horn antenna, etc.

As shown in FIG. 6A, the receiver antenna module 12 includes a reception array antenna Ar including a plurality of reception antennas arranged on the substrate 14 in a two-dimensional manner. The inverted triangle in the figure indicates the antenna. Nrx (four in the example of FIG. 6A) reception antennas are evenly spaced in the x-axis direction at a first distance Δx. Nry (four in the example of FIG. 6A) are evenly spaced in the y-axis direction at a second distance Δy. The x-axis direction and y-axis direction are two intersecting directions. For example, the x-axis direction and y-axis direction are orthogonal. The reception array antenna is called Uniform Rectangular Array (URA). The numbers Nrx and Nry are arbitrary and may be different. The first distance Δx and the second distance Δy are arbitrary and may be different. An example of the first distance Δx and the second distance Δy is approximately half of the wavelength λ (half-wavelength: λ/2) of the highest intensity wave in radio wave transmitted from the transmission antenna modules 16 and 22. In FIG. 6A, the center of the substrate 12 and the center of the reception array antenna Ar are aligned, but they may be different.

The shape of the array antenna, defined by the arrangement of the outermost antennas of the array, is not limited to a rectangle. It may include a quadrilateral region. For example, the shape of the array antenna is rectangular, e.g., rhomboid, trapezoidal, or parallelogram. There may be some number of antennas arranged outside the quadrilateral region. The shape of the array antenna may be a triangular, pentagonal, hexagonal or other polygonal or circular shape. The shape of the array antenna may be a complex polygonal shape including acute and obtuse angles. Furthermore, the shape of the array antenna may have a side that passes through the center of a portion of the reception antennas, and may be shaped to enclose another portion of the reception antennas. When the array can take a plurality of shapes, the shape in which the sides pass over the most reception antennas will be selected as the shape of the array. For example, the center of the array is the center of this selected shape.

The reception array antenna Ar has defined array sizes in the x-axis direction and the y-axis direction. An array size Lx in the x-axis direction and an array size Ly in the y-axis direction are expressed as follows.

$$Lx = Nrx \times \Delta x \quad \text{Equation 10}$$

$$Ly = Nry \times Ly \quad \text{Equation 11}$$

As shown in FIG. 6B, the first transmission antenna module 16 includes a first transmission antenna At1 arranged on a substrate 18, and the second transmission antenna module 22 includes a second transmission antenna At2 arranged on a substrate 24. The first transmission antenna module 16 and the second transmission antenna module 22 form a transmission array antenna. In FIG. 6B, the centers of the transmission antennas At1 and At2 and the centers of the substrates 18 and 24 are aligned, respectively. However, they may not be aligned. The transmission antenna modules 16 and 22 are arranged such that the centers of the two transmission antennas At1 and At2 are separated by a distance D in at least one of the x-axis direction and the y-axis direction. The distance D is the array size Lx or Ly. That is, the two transmission antennas At1 and At2 are placed on a straight line parallel to the x-axis direction. The distance D in the x-axis direction is equal to the product of the first distance Δx and the number Nrx of the antennas. Alternatively, the two transmission antennas At1 and At2 are placed on a straight line parallel to the y-axis direction. The distance D in the y-axis direction is equal to the product of the second distance Δy and the number Nry of the antennas. Alternatively, the two transmission antennas At1 and At2 are separated by the product of the first distance Δx and the number Nrx of the antennas in the x-axis direction and separated by the product of the second distance Δy and the number Nry of the antennas in the y-axis direction.

Note that, instead of the two transmission antenna modules 16 and 22 being provided separately, the two transmission antennas At1 and At2 may be provided on one substrate. The two transmission antennas At1 and At2 may be provided with their centers separated from each other by the distance D. In this case, the substrate may be provided such that the transmission antennas At1 and At2 are arranged in the x-axis direction or the y-axis direction. In addition, instead of at least two transmission antenna modules 16 and 22 and one reception antenna module 12 being provided separately, the reception array antenna Ar and the two transmission antennas At1 and At2 may be arranged on one substrate, centers of the antennas are separated by the distance D. In this case, the transmission antennas At1 and At2 are arranged in the x-axis direction or the y-axis direction.

Examples of an arrangement of the reception antenna module 12 and the transmission antenna modules 16 and 22 is shown in FIGS. 7A and 7B. For example, as shown in FIG. 7A, the transmission antenna modules 16 and 22 may be arranged in the same plane as the reception antenna module 12 resides. In this case, the reception antenna module 12 and the transmission antenna modules 16 and 22 may include substrates, respectively, or the reception antenna array Ar and the transmission antennas At1 and At2 are arranged on one substrate.

In addition, as shown in FIG. 7B, the reception antenna module 12 and the transmission antenna modules 16 and 22 may be placed separately in the first and second planes parallel to each other, instead of being placed on the same plane. The first and second planes are defined by the x-axis and the y-axes, but in different positions in the z-axis direction. For example, the reception antenna module 12 is placed in the first plane at a first position in the z-axis direction and the transmission antenna modules 16 and 22 may be placed in the second plane at a second position in the z-axis direction.

FIG. 8 shows an example of an arrangement of the transmission antenna modules 16 and 22. The center of the transmission antenna At1 of the first transmission antenna module 16 is the origin of the x-y coordinates (0, 0). The second transmission antenna module 22 can be positioned in many different locations, and the second transmission antenna modules 22 positioned in many different locations will be referred to as second transmission antenna modules 22a to 22h. That is, the second transmission antenna module 22 is at least one of the second transmission antenna modules 22a to 22h.

The second transmission antenna module 22a is placed such that the center of the second transmission antenna At2 is positioned at coordinates (+Lx, 0) which are apart from the center of the first transmission antenna At1 by +Lx in the x-axis direction. The second transmission antenna module 22b is placed such that the center of the second transmission antenna At2 is positioned at coordinates (−Lx, 0) which are apart from the center of the first transmission antenna At1 by −Lx in the x-axis direction.

The second transmission antenna module 22c is placed such that the center of the second antenna At2 is positioned at coordinates (0, +Lx) which are apart from the center of the first transmission antenna At1 by +Lx in the y-axis direction. The second transmission antenna module 22d is placed such that the center of the second antenna At2 is positioned at coordinates (0, −Lx) which are apart from the center of the first transmission antenna At1 by −Lx in the y-axis direction.

The second transmission antenna module 22e is arranged such that the center of the second antenna At2 is positioned at coordinates (+Lx, +Ly) which are apart from the center of the first transmission antenna At1 by +Lx in the x-axis direction and +Ly in the y-axis direction, that is, in a diagonal direction. The second transmission antenna module 22f is arranged such that the center of the second antenna At2 is positioned at coordinates (−Lx, +Ly) which are apart from the center of the first transmission antenna At1 by −Lx in the x-axis direction and +Ly in the y-axis direction, that is, in a diagonal direction. The second transmission antenna module 22g is arranged such that the center of the second antenna At2 is positioned at coordinates (−Lx, −Ly) which are apart from the center of the first transmission antenna At1 by −Lx in the x-axis direction and −Ly in the y-axis direction, that is, in a diagonal direction. The second transmission antenna module 22h is arranged such that the center of the second antenna At2 is positioned at coordinates (+Lx, −Ly) which are apart from the center of the first transmission antenna At1 by +Lx in the x-axis direction and −Ly in the y-axis direction, that is, in a diagonal direction.

Radio waves radiated from the first and second transmission antennas At1 and At2, arranged as shown in FIG. 8, are reflected by a target. Reflected radio waves are received by the reception array antenna Ar of the URA, and thus, MIMO array antennas are formed at the respective locations of the first and second transmission antennas At1 and At2.

Figure 9:
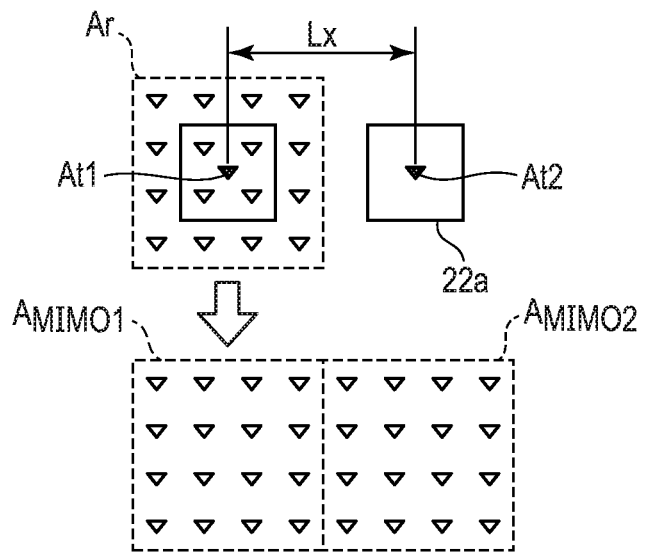
FIG. 9 illustrates an example of a MIMO array antenna according to the first embodiment.

FIG. 9 shows an example of MIMO array antennas $A_{MIMO1}$ and $A_{MIMO2}$. FIG. 9 and similar FIGs thereafter show, for the sake of convenience of illustration, an example in which the center of the reception array antenna Ar is aligned with the center of the substrate 14 of the reception antenna module 12, and the center of the transmission antennas At1 and At2 are aligned with the center of the transmission antenna modules 16 and 22. The reception array antenna Ar and the transmission antennas At1 and At2 may be placed in a plane defined by the same x-axis and the y-axis as described with reference to FIGS. 7A and 7B, and their placement in the plane is arbitrary. For the sake of simpler explanation, FIG. 9 and similar FIGs thereafter show an example in which the center of the reception array antenna Ar and the center of the transmission antenna At1 are aligned.

FIG. 9 shows an example in which the second transmission antenna module 22a is used. The center of the second antenna At2 is positioned at coordinates (+Lx, 0) which are apart from the center of the first transmission antenna At1 (or the first transmission antenna module 16) by +Lx in the x-axis direction. Instead of the second transmission antenna module 22a, the second antenna module 22b may be used. The center of the transmission antenna At2 is be positioned at coordinates (−Lx, 0) which are apart from the center of the transmission antenna At1 by −Lx in the x-axis direction.

Furthermore, instead of the second transmission antenna module 22a, the second transmission antenna module 22c or 22d may be used. The center of the transmission antenna At2 is positioned at coordinates (0, +Ly) or (0, −Ly) which are apart from the center of the transmission antenna At1 by ±Ly in the y-axis direction.

When using the second transmission antenna module 22a, the first MIMO array antenna $A_{MIMO1}$ is formed by copying the reception array antenna Ar (reception antennas) to a region having a center positioned at the first transmission antenna At1. The center of the first transmission antenna At1 and the center of the first MIMO array antenna $A_{MIMO1}$ are aligned. The second MIMO array antenna $A_{MIMO2}$ is formed by copying the reception array antenna Ar (reception antennas) to a region having a center positioned at the second transmission antenna Ar2. That is, the second MIMO array antenna $A_{MIMO2}$ is formed in the region having the center positioned at coordinates (+Lx, 0) which are apart from the center of the first transmission antenna At1 by +Lx in the x-axis direction. The center of the second transmission antenna At2 is aligned with the center of the second MIMO array antenna $A_{MIMO2}$.

The positions of the antennas forming each of the first and second MIMO array antennas $A_{MIMO1}$ and $A_{MIMO2}$ respectively correspond to the positions of the reception antennas forming the reception array antenna Ar. The size of each of the first and second MIMO array antennas $A_{MIMO1}$ and $A_{MIMO2}$ in the x-axis direction is Lx and the size thereof in the y-axis direction is Ly. The number of antennas forming the first and second MIMO array antennas $A_{MIMO1}$ and $A_{MIMO2}$ is the same as that of the reception antennas forming the reception array antenna Ar. As a result, a MIMO array antenna is formed, and the size of the MIMO array antenna is twice the size of the reception array antenna Ar.

Figure 10:
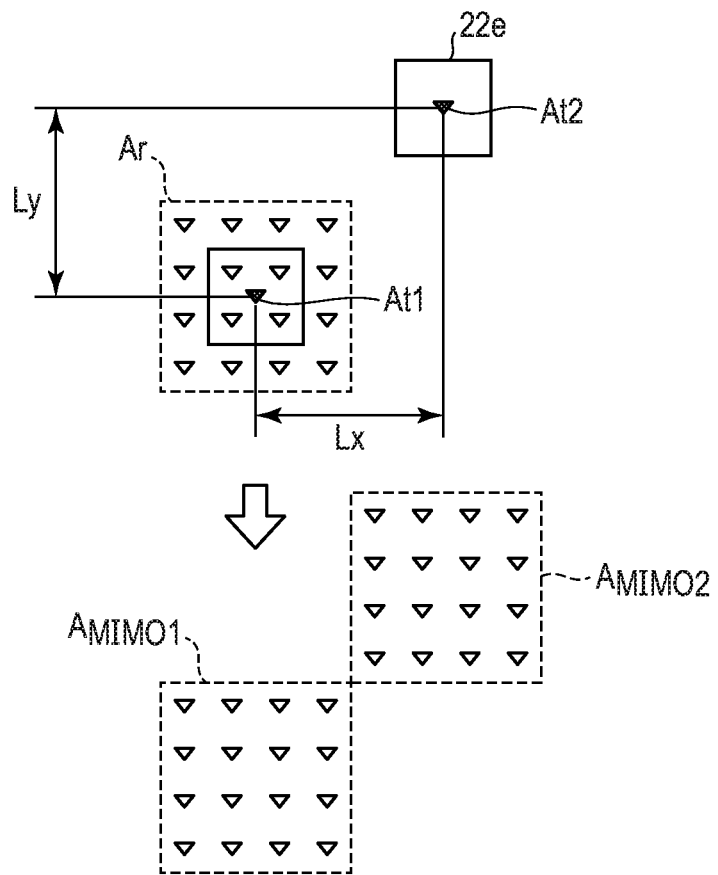
FIG. 10 illustrates another example of the MIMO array antenna according to the first embodiment.

FIG. 10 shows another example of a MIMO array antenna. FIG. 10 shows an example in which the second transmission antenna module 22e is used. The center of the second antenna At2 is positioned at coordinates (+Lx, +Ly) which are apart from the center of the first transmission antenna At1 (or the first transmission antenna module 16) by +Lx in the x-axis direction and +Ly in the y-axis direction. Instead of the second transmission antenna module 22e, the second antenna module 22g may be used. The center of the transmission antenna At2 is positioned at coordinates (−Lx, −Ly) which are apart from the center of the transmission antenna At1 by −Lx in the x-axis direction and −Ly in the y-axis direction. Furthermore, instead of the second transmission antenna module 22e, the second transmission antenna module 22h may be used. The center of the transmission antenna At2 is positioned at coordinates (+Lx, −Ly) which are apart from the center of the transmission antenna At1 by +Lx in the x-axis direction and −Ly in the y-axis direction. Moreover, the second transmission antenna module 22f may be used. The center of the transmission antenna At2 is positioned at coordinates (−Lx, +Ly) which are apart from the center of the transmission antenna At1 by −Lx in the x-axis direction and +Ly in the y-axis direction.

When using the second transmission antenna module 22e, the first MIMO array antenna $A_{MIMO1}$ is formed by copying the reception array antenna Ar (reception antennas) to a region having a center positioned at the first transmission antenna At1. The center of the first transmission antenna At1 and the center of the MIMO array antenna $A_{MIMO1}$ are aligned. The second MIMO array antenna $A_{MIMO2}$ is formed by copying the reception array antenna Ar (reception antennas) to a region having a center positioned at the second transmission antenna At2. That is, the second MIMO array antenna $A_{MIMO2}$ is formed in the region having the center positioned at coordinates (+Lx, +Ly) which are apart from the center of the first transmission antenna At1 by +Lx in the x-axis direction and +Ly in the y-axis direction. The center of the second transmission antenna At2 is aligned with the center of the second MIMO array antenna $A_{MIMO2}$.

The positions of the antennas forming each of the first and second MIMO array antennas $A_{MIMO1}$ and $A_{MIMO2}$ respectively correspond to the positions of the reception antennas forming the reception array antenna Ar. The size of each of the first and second MIMO array antennas $A_{MIMO1}$ and $A_{MIMO2}$ in the x-axis direction is Lx and the size thereof in the y-axis direction is Ly. The number of antennas forming the first and second MIMO array antennas $A_{MIMO1}$ and $A_{MIMO2}$ is the same as that of the reception antennas forming the reception array antenna Ar. As a result, a MIMO array antenna that is formed, and the size of the MIMO array antenna is twice the size of the reception array antenna Ar.

FIG. 11 shows yet another example of the MIMO array antenna. In FIG. 11, all the second transmission antenna modules 22a to 22h shown in FIG. 8 are used. The center of the reception array antenna Ar is aligned with the center of the transmission antenna At1. In this case, the eight MIMO array antennas $A_{MIMO2}$ to $A_{MIMO9}$ are formed in eight regions having centers positioned at the second transmission antennas At2, respectively. The eight MIMO array antennas $A_{MIMO2}$ to $A_{MIMO9}$ are formed by copying the reception array antenna Ar (reception antennas) to eight regions having the centers positioned at the second transmission antennas At2, respectively. The centers of each of the second transmission antennas At2 and each of the MIMO array antennas $A_{MIMO2}$ to $A_{MIMO9}$ are aligned.

As a result, the MIMO array antenna $A_{MIMO2}$ is formed in the region having the center positioned at coordinates (+Lx, 0) which are apart from the center of the reception array antenna Ar by +Lx in the x-axis direction. The MIMO array antenna $A_{MIMO3}$ is formed in the region having the center positioned at coordinates (−Lx, 0) which are apart from the center of the reception array antenna Ar by −Lx in the x-axis direction. The MIMO array antenna $A_{MIMO4}$ is formed in the region having the center positioned at coordinates (0, +Ly) which are apart from the center of the reception array antenna Ar by +Ly in the y-axis direction. The MIMO array antenna $A_{MIMO5}$ is formed in the region having the center positioned at coordinates (0, −Ly) which are apart from the center of the reception array antenna Ar by −Ly in the y-axis direction. The MIMO array antenna $A_{MIMO6}$ is formed in the region having the center positioned at coordinates (+Lx, +Ly) which are apart from the center of the reception array antenna Ar by +Lx in the x-axis direction and +Ly in the y-axis direction. The MIMO array antenna $A_{MIMO7}$ is formed in the region having the center positioned at coordinates (−Lx, −Ly) which are apart from the center of the reception array antenna Ar by −Lx in the x-axis direction and −Ly in the y-axis direction. The MIMO array antenna $A_{MIMO8}$ is formed in the region having the center positioned at coordinates (+Lx, −Ly) which are apart from the center of the reception array antenna Ar by +Lx in the x-axis direction and −Ly in the y-axis direction. The MIMO array antenna $A_{MIMO9}$ is formed in the region having the center positioned at coordinates (−Lx, +Ly) which are apart from the center of the reception array antenna Ar by −Lx in the x-axis direction and +Ly in the y-axis direction.

It is not necessary to use all of the second transmission antenna modules 22a to 22h, and the second transmission antenna modules 22a to 22h corresponding to the position of the MIMO array antenna to be formed may be used. That is, the second transmission antenna modules 22a to 22h are arranged in a region where the MIMO array antenna is to be formed.

The positions of the virtual antennas forming each of the eight MIMO array antennas $A_{MIMO2}$ to $A_{MIMO9}$ respectively correspond to the positions of the reception antennas forming the reception array antenna Ar. The size of the eight MIMO array antennas $A_{MIMO2}$ to $A_{MIMO9}$ in the x-axis direction is Lx and the size thereof in the y-axis direction is Ly. The number of antennas forming each of the MIMO array antennas $A_{MIMO2}$ to $A_{MIMO9}$ is the same as that of the reception antennas forming the reception array antenna Ar. As a result, MIMO array antennas $A_{MIMO1}$ to $A_{MIMO9}$ are formed, and the total size of the MIMO array antennas $A_{MIMO1}$ to $A_{MIMO9}$ is nine times the size of the reception array antenna Ar at maximum. The multiple corresponds to the number of second transmission antenna module.

According to the first embodiment, transmission/reception will be performed using a reception array antenna of the URA and a transmission array antenna including at least two transmission antennas. The at least two transmission antennas are apart from each other in at least one of the x-axis direction and y-axis directions by the array size of Lx in the x-axis direction or Ly in the y-axis direction. With the transmission array antenna and the reception array antenna, a MIMO array antenna having a size greater than the reception array antenna can be formed.

Second Embodiment

In addition to the formation of the MIMO array antenna according to the first embodiment, a second embodiment will be explained in which a virtual array antenna is formed using the KR transformation as in Equation 4 to Equation 6, and FIGS. 4 and 5.

Figure 13:
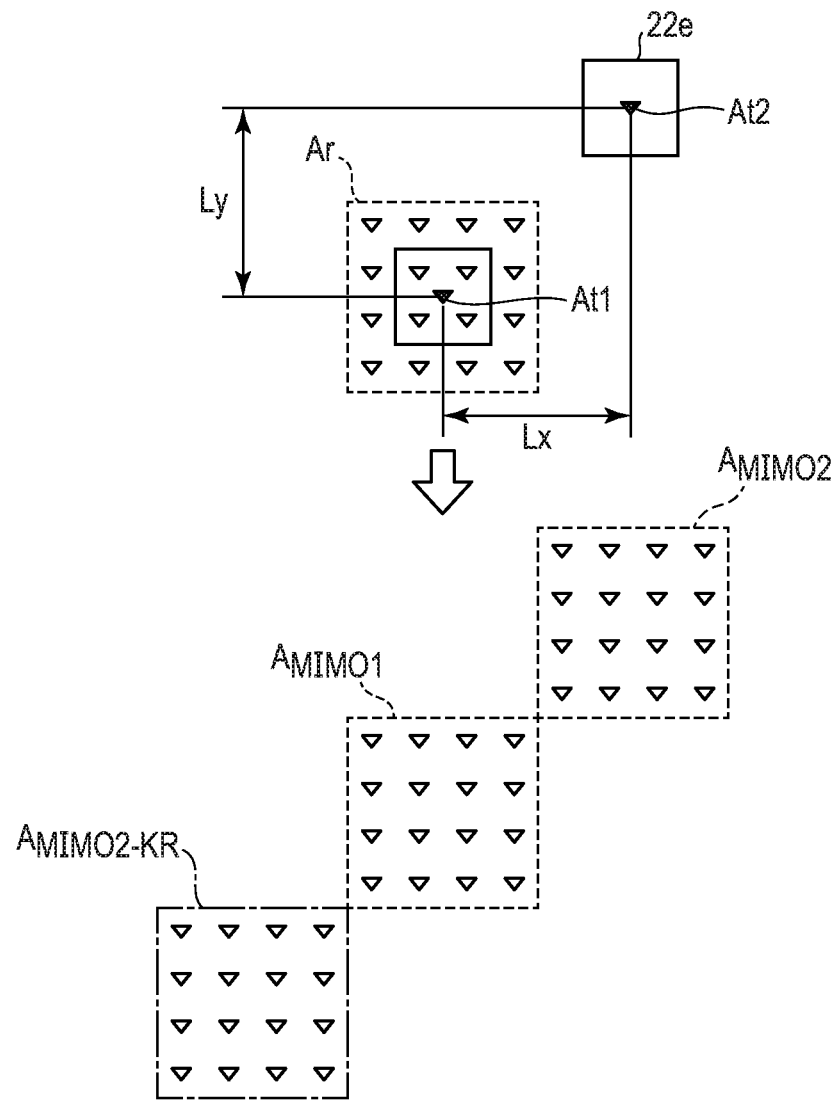
FIG. 13 illustrates another example of the virtual array antenna according to the second embodiment.
Figure 14:
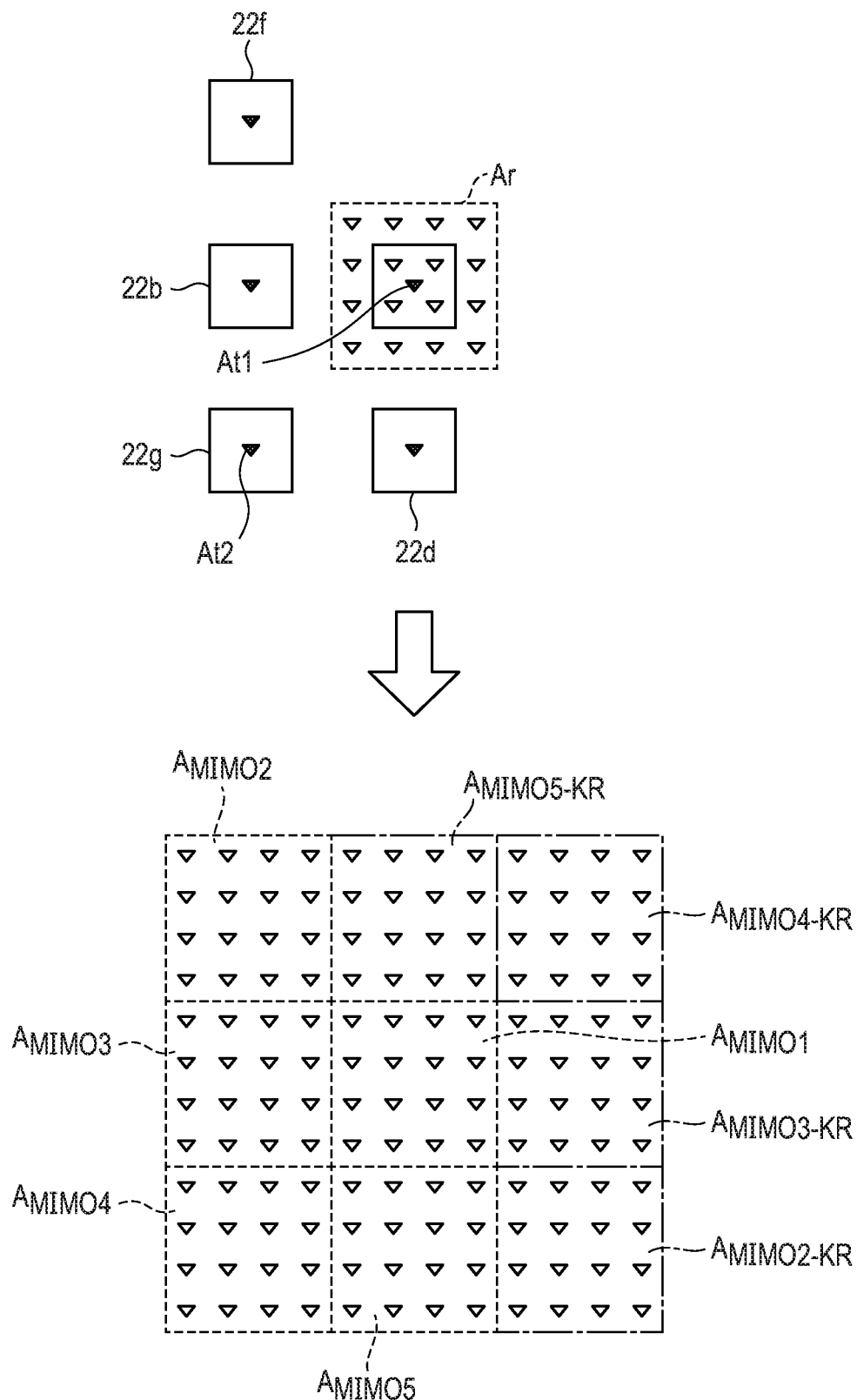
FIG. 14 illustrates another example of the virtual array antenna according to the second embodiment.

FIGS. 12 to 14 show examples of virtual array antennas formed by the KR transformation.

FIG. 12 shows an example of a virtual array antenna. The arrangement of the reception array antenna Ar, transmission antenna At1, and the transmission antenna At2 in FIG. 12 corresponds to that of the first embodiment in FIG. 9. Therefore, the MIMO array antenna $A_{MIMO2}$ is formed by copying the reception array antenna Ar (reception antennas) to a region having the center positioned at the second transmission antenna At2. That is, the MIMO array antenna $A_{MIMO2}$ is located in the region having the center positioned at coordinates (+Lx, 0) which are apart from the center of the first transmission antenna At1 by +Lx in the x-axis direction.

As shown in FIGS. 4 and 5, the MIMO-KR transformation virtual array antenna $A_{MIMO2-KR}$ is formed in a region which is symmetrical to the MIMO array antenna $A_{MIMO2}$ with respect to the first transmission antenna Art, that is, a region having the center positioned at coordinates (−Lx, 0) which are apart from the center of the first transmission antenna At1 by −Lx in the x-axis direction.

The positions of the virtual antennas forming the MIMO-KR transformation virtual array antenna $A_{MIMO2-KR}$ respectively correspond to the positions of the reception antennas forming the reception array antenna Ar. The array size of the MIMO-KR transformation virtual array antenna $A_{MIMO2-KR}$ is Lx in the x-axis direction and Ly in the y-axis direction. The number of virtual antennas forming the MIMO-KR transformation virtual array antenna $A_{MIMO2-KR}$ is the same as the number of reception antennas forming the reception array antenna Ar. As a result, the MIMO array antennas and the MIMO-KR transformation virtual array antenna are formed, and the total size of the MIMO array antennas and the MIMO-KR transformation virtual array antenna is three times the size of the reception array antenna Ar.

FIG. 13 shows another example of a virtual array antenna. The arrangement of the reception array antenna Ar, and the transmission antennas At1 and At2 in FIG. 13 corresponds to that of FIG. 10 of the first embodiment. Therefore, the MIMO array antenna $A_{MIMO2}$ is formed by copying the reception array antenna Ar (reception antennas) to a region having the center positioned at the second transmission antenna At2. That is, the MIMO array antenna $A_{MIMO2}$ is located in the region having the center positioned at coordinates (+Lx, +Ly) which are apart from the center of the first transmission antenna At1 by +Lx in the x-axis direction and +Ly in the y-axis direction.

As shown in FIGS. 4 and 5, the MIMO-KR transformation virtual array antenna $A_{MIMO2-KR}$ is formed in a region which is symmetrical to the MIMO array antenna $A_{MIMO2}$ with respect to the first transmission antenna Ar1, that is, a region having the center positioned at coordinates (−Lx, −Ly) which are apart from the center of the reception array antenna Ar by −Lx in the x-axis direction and −Ly in the y-axis direction.

The positions of the virtual antennas forming the MIMO-KR transformation virtual array antenna $A_{MIMO2-KR}$ respectively correspond to the positions of the reception antennas forming the reception array antenna Ar. The array size of the MIMO-KR transformation virtual array antenna $A_{MIMO2-KR}$ is Lx in the x-axis direction and Ly in the y-axis direction. The number of virtual antennas forming the MIMO-KR transformation virtual array antenna $A_{MIMO2-KR}$ is the same as the number of reception antennas forming the reception array antenna Ar. As a result, the MIMO array antennas and the virtual array antenna are formed, and the total size of the MIMO array antennas and the virtual array antenna is three times the size of the reception array antenna Ar.

FIG. 14 shows yet another example of a virtual array antenna. The arrangement of the reception array antenna Ar, and the transmission antennas At1 and At2 in FIG. 14 corresponds to the first embodiment of FIG. 11. However, in FIG. 14, not all of the second transmission antenna modules 22a to 22h shown in FIG. 8 are used, but up to four of them, e.g., second transmission antenna modules 22f, 22b, 22g, and 22d are used. The transmission antenna module used is a module positioned in one of point-symmetric two regions with respect to the first transmission antenna At1. That is, two transmission antennas At2 included in any two second transmission antenna modules 22 are located in two regions in non-point symmetric with respect to the first transmission antenna At1.

In this case, as in the first embodiment, the MIMO array antenna $A_{MIMO2}$ formed by the second transmission antenna modules 22f is located in a region having a center positioned at coordinates (−Lx, +Ly) which are apart from the center of the reception array antenna Ar by −Lx in the x-axis direction and by +Ly in the y-axis direction. The MIMO array antenna $A_{MIMO3}$ formed by the second transmission antenna module 22b is located in a region having a center positioned at coordinates (−Lx, 0) which are apart from the center of the reception array antenna Ar by −Lx in the x-axis direction. The MIMO array antenna $A_{MIMO4}$ formed by the second transmission antenna module 22g is located in a region having a center positioned at coordinates (−Lx, −Ly) which are apart from the center of the reception array antenna Ar by −Lx in the x-axis direction and −Ly in the y-axis direction. The MIMO array antenna $A_{MIMO5}$ formed by the second transmission antenna module 22d is located in a region having a center positioned at coordinates (0, −Ly)

which are apart from the center of the reception array antenna Ar by −Ly in the y-axis direction.

As shown in FIGS. 4 and 5, the MIMO-KR transformation virtual array antennas $A_{MIMO2-KR}$ to The $A_{MIMO5-KR}$ are formed in regions symmetric with the MIMO array antennas $A_{MIMO2}$ to $A_{MIMO5}$ with respect to the first transmission antenna At1. That is, the MIMO-KR transformation virtual array antenna $A_{MIMO2-KR}$ is formed in a region having a center positioned at coordinates (+Lx, −Ly) which are apart from the center of the reception array antenna Ar by +Lx in the x-axis direction and −Ly in the y-axis direction. The MIMO-KR transformation virtual array antenna $A_{MIMO3-KR}$ is formed in a region having a center positioned at coordinates (+Lx, 0) which are apart from the center of the reception array antenna Ar by +Lx in the x-axis direction. The MIMO-KR transformation virtual array antenna $A_{MIMO4-KR}$ is formed in a region having a center positioned at coordinates (+Lx, +Ly) which are apart from the center of the reception array antenna Ar by +Lx in the x-axis direction and +Ly in the y-axis direction. The MIMO-KR transformation virtual array antenna $A_{MIMO5-KR}$ is formed in a region having a center positioned at coordinates (0, +Ly) which are apart from the center of the reception array antenna Ar by +Ly in the y-axis direction.

The positions of the virtual antennas forming the MIMO-KR transformation virtual array antennas $A_{MIMO2-KR}$ to $A_{MIMO5-KR}$ respectively correspond to the positions of the reception antennas forming the reception array antenna Ar. The array size of the MIMO-KR transformation virtual array antennas $A_{MIMO2-KR}$ to $A_{MIMO5-KR}$ is Lx in the x-axis direction and Ly in the y-axis direction. The number of virtual antennas forming each of the MIMO-KR transformation virtual array antennas $A_{MIMO2-KR}$ to $A_{MIMO5-KR}$ is the same as the number of reception antennas forming the reception array antenna Ar. As a result, as in the first embodiment, the MIMO array antennas and the MIMO-KR transformation virtual array antennas are formed around the reception array antenna Ar, and the total size of the MIMO array antennas and the MIMO-KR transformation virtual array antennas is nine times the size of the reception array antenna Ar at maximum.

Thus, according to the second embodiment, the second transmission antenna At2 is formed in one of two symmetric regions with respect to the first transmission antenna At1. The MIMO array antenna $A_{MIMO}$ is formed in the region of the second transmission antenna At2, and the MIMO-KR transformation virtual array antenna $A_{MIMO-KR}$ is formed in the region symmetrical to the second transmission antenna At2 with respect to the reception array antenna Ar. Thus, the virtual array antenna is formed efficiently by using the KR transformation.

FIG. 15 is a block diagram showing an example of the radar system of the second embodiment. A transmission signal generation circuit 32 inputs a transmission signal of a baseband frequency to a transmission circuit 36 via a D/A converter 34. The transmission signal generation circuit 32 also performs a beamforming process. The transmission circuit 36 performs amplification of input signal, transmission process such as frequency conversion, etc., and supplies the transmission signal of radio frequency to the transmission antennas At1 and At2. The transmission antennas At1 and At2 each transmit a signal as radio waves to a target 40 in a desired direction.

The reception array antenna Ar receives the radio waves reflected from the target 40. Each reception antenna of the reception array antenna Ar inputs a radio frequency reception signal to a reception circuit 42. The reception circuit 42 performs reception processing such as amplification and frequency conversion on the input signal to input the reception signal of the baseband frequency to a virtual array processor 46 via an A/D converter 44. The virtual array processor 46 performs the KR transformation process as shown in Equations 4 to 6, and obtains the vector $z_e$ including only the non-overlapping elements. Thus, the MIMO array antenna and the MIMO-KR transformation virtual array antenna $A_{MIMO-KR}$ are formed. The number of antennas forming each of the MIMO array antenna $A_{MIMO}$ and the MIMO-KR transformation virtual array antenna $A_{MIMO-KR}$ is greater than the number of reception antennas forming the reception array antenna. The virtual array processor 46 inputs reception signals from the antennas forming the MIMO array antenna $A_{MIMO}$ and MIMO-KR transformation virtual array antenna $A_{MIMO-KR}$ to a reception signal processor 48. The reception signal processor 48 also performs beamforming processing.

The transmission circuit 36 may perform a time-division drive to cause a signal to be transmitted from the transmitter antenna At1 at one timing and a signal to be transmitted from the transmission antenna At2 at another timing. The time-division drive avoids interference between multiple transmission signals. The transmission circuit 36 may transmit a plurality of transmission signals with different frequencies and different coding schemes at the same time. In this case, the reception circuit 42 can identify the reception signals from the antennas which have received transmission signals transmitted at the same time based on the frequency and coding scheme.

The transmission signal generation circuit 32, virtual array processor 46, and reception signal processor 48 are digital signal processors, and may be formed of a conventional IC. Since the number of antennas that can be connected to a conventional IC is limited, a reception array antenna with a large number of antennas may not be used. However, according to the second embodiment, an array antenna including virtual antennas the number of which is greater than the number of antennas forming the reception array antenna can be formed, and thus, transmission/reception processes can be performed using a conventional IC.

Note that the radar apparatus of FIG. 15 can be applied to the first embodiment. In that case, the first embodiment does not utilize the KR transformation and the array processor 46 will be omitted.

According to the second embodiment, transmission/reception will be performed using a reception array antenna of the URA and a transmission array antenna including at least two transmission antennas. The at least two transmission antennas are apart from each other in at least one of the x-axis direction and y-axis directions by an array size of Lx in the x-axis direction or Ly in the y-axis direction. Thus, the MIMO array antenna is formed where the size of the MIMO array antenna is greater than the size of the reception array antenna Ar. According to the second embodiment, the MIMO-KR transformation virtual array antenna is formed using the KR transformation, and thus, the array antenna can be formed even more efficiently.

According to the second embodiment, the positions of the antennas of each of the MIMO array antenna $A_{MIMO}$, MIMO-KR transformation virtual array antenna $A_{MIMO-KR}$ correspond to the positions of the reception antennas forming the reception array antennas Ar. The array size of the MIMO array antenna $A_{MIMO}$ and MIMO-KR transformation virtual array antennas $A_{MIMO-KR}$ is Lx in the x-axis direction and Ly in the y-axis direction. The number of virtual antennas forming each of the MIMO array antenna $A_{MIMO}$ and MIMO-KR transformation virtual array antennas $A_{MIMO\text{-}KR}$ is the same as the number of reception array antennas forming the reception array antennas Ar.

Third Embodiment

According to the first and second embodiments, the reception array antenna is an array antenna of the URA. A third embodiment will be described where the reception array antenna is an array antenna of the MRA.

Figure 16:
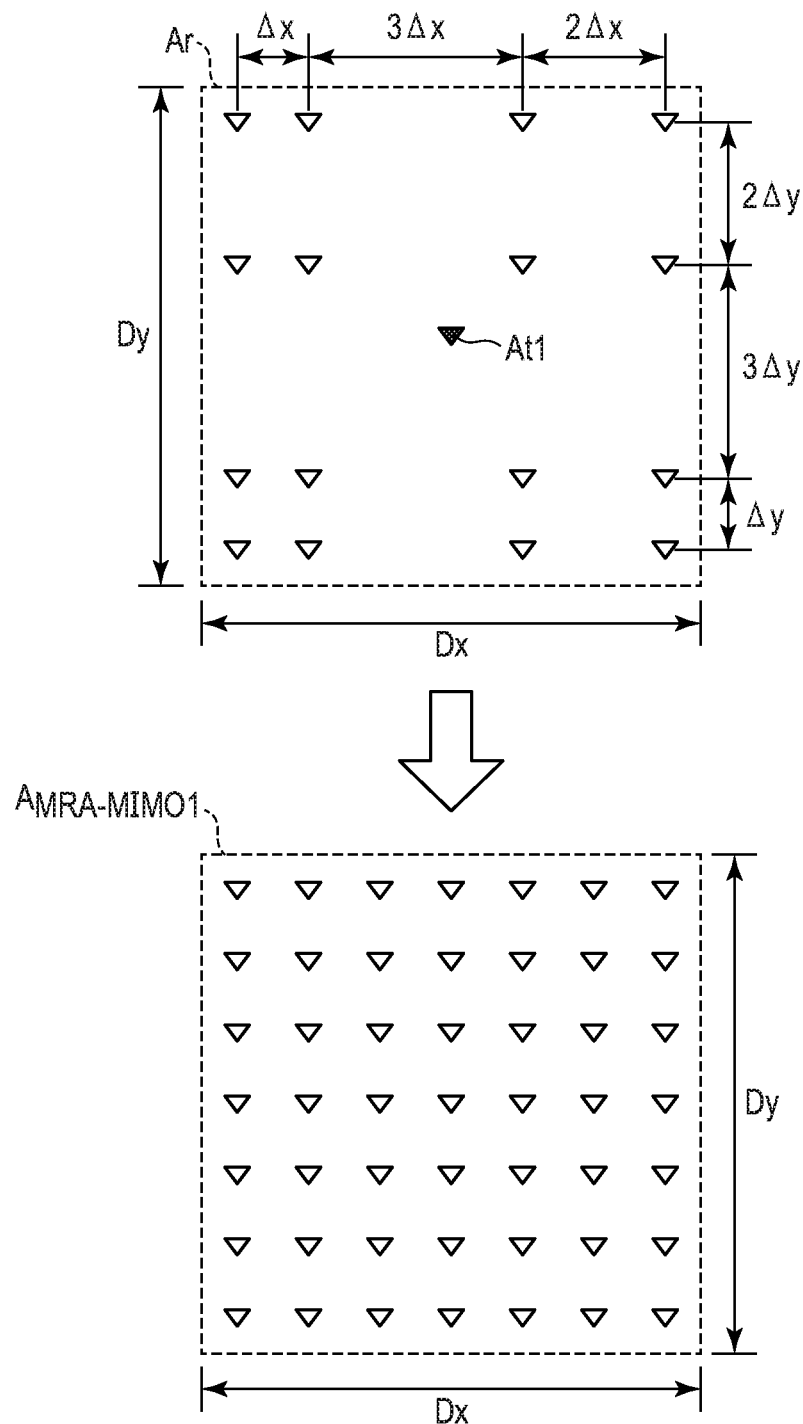
FIG. 16 illustrates an example of a virtual array antenna according to a third embodiment.

FIG. 16 shows an example of a MIMO array antenna $A_{MRA\text{-}MIMO1}$ formed of a transmission antenna At1 and a reception array antenna Ar related of the MRA.

The reception array antenna Ar is a 4×4 array antenna of the MRA in which four reception antennas are arranged in the x-axis direction and four reception antennas are arranged in the y-axis direction as in the first and second embodiments. The antennas are, unlike the first and second embodiments, arranged at irregular intervals. For example, intervals of the reception antennas in the x-axis direction are set to Δx, 3Δx, and 2Δx, and intervals in the y-axis direction are set to 2Δy, 3Δy, and Δy.

According to the first and second embodiments, an array antenna of the URA is used, and the array size Lx is defined by the product of the number Nrx of antennas in the x-axis direction and Δx, and the array size Ly in the y-axis direction is defined by the product of the number Nry of antennas and Δy. However, according to the third embodiment, an array antenna of the MRA is used, and the array size Dx in the x-axis direction and the array size Dy in the y-axis direction of the reception array antenna Ar will be represented, based on the sum of the intervals plus Δx(Δy), as follows, regardless of the numbers Nrx(Nry) thereof.

$$Dx=(\Delta x+3\Delta x+2\Delta x)+\Delta x=7\Delta x \quad \text{Equation 12}$$

$$Dy=(\Delta y+3\Delta y+2\Delta y)+\Delta y=7\Delta y \quad \text{Equation 13}$$

When radio waves are radiated from the single transmitter antenna At1 and the reflected waves of the radio waves are received by the reception array antenna Ar of the MRA, a MIMO array antenna $A_{MRA\text{-}MIMO1}$ of the same size as 7Δx×7Δy size reception array antennas is formed. In the MIMO array antenna $A_{MRA\text{-}MIMO1}$, seven antennas are arranged in the x-axis direction at Δx interval and seven antennas are arranged at Δy intervals in the y-axis direction. FIG. 16 shows an example where the center of the transmission antenna At1 is aligned with the center of the reception array antenna Ar. However, the placement of the transmission antenna At1 is arbitrary.

According to the reception array antenna of the MRA, distances between adjacent two of the reception antennas arranged in the x-axis direction are not the same. The distances include a distance Δx which is a minimum distance between adjacent two of the reception antennas arranged in the x-axis direction, and a positive integer multiple of the distance Δx. Based on the distances between adjacent two of the reception antennas arranged in the x-axis direction, for example, an arithmetic progression in which the first term is Δx and the tolerance is Δx is established.

Similarly, distances between adjacent two of the reception antennas arranged in the y-axis direction are not the same. The distances include a distance Δy which is a minimum distance between adjacent two of the reception antennas arranged in the y-axis direction, and a positive integer multiple of the distance Δy. Based on the distances between adjacent two of the reception antennas arranged in the y-axis direction, for example, an arithmetic progression in which the first term is Δy and the tolerance is Δy is established.

FIG. 16 shows an example of combination of a reception array antenna of the MRA and a single transmission antenna. Note that as shown in FIGS. 17 and 18, MIMO array antennas may be formed by combining the reception array antenna of the MRA and multiple, for example, two transmission antennas.

Figure 17:
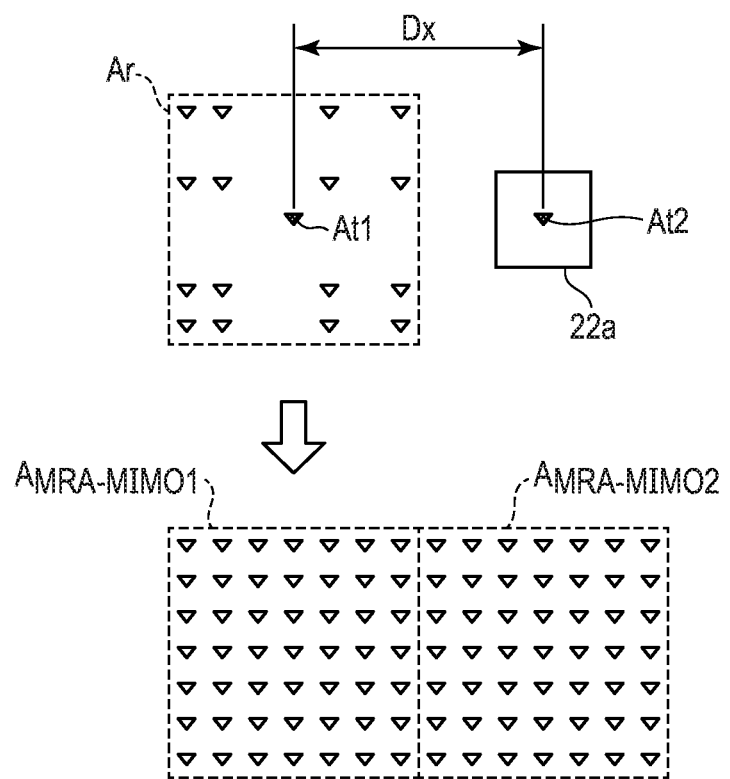
FIG. 17 illustrates another example of the virtual array antenna according to the third embodiment.

FIG. 17 shows an example, as in the first embodiment shown in FIG. 9, using the second transmission antenna module 22a having the transmission antenna At2. The center of the transmission antenna At2 is positioned at coordinates (+Dx, 0) which are apart from the center of the first transmission antenna At1 by +Dx in the x-axis direction. Note that, as in the first embodiment, the second transmission antenna module 22b, 22c, or 22d may be used instead of the second transmission antenna module 22a.

When using the second transmission antenna module 22a, a MIMO array antenna $A_{MRA\text{-}MIMO2}$ is formed by copying the MIMO array antenna $A_{MRA\text{-}MIMO1}$ (reception antennas) to a region having a center positioned at the second transmission antenna At2. That is, the MIMO array antenna $A_{MRA\text{-}MIMO2}$ is formed in the region having a center positioned at coordinates (+Dx, 0) which are apart from the center of the first transmission antenna At1 by +Dx in the x-axis direction. The center of the second transmission antenna At2 is aligned with the center of the MIMO array antenna $A_{MRA\text{-}MIMO2}$.

The positions of the antennas forming the MIMO array antenna $A_{MAR\text{-}MIMO2}$ respectively correspond to the positions of the antennas forming the MIMO array antenna $A_{MRA\text{-}MIMO1}$. The size of the MIMO array antenna $A_{MAR\text{-}MIMO2}$ is Dx in the x-axis direction and Dy in the y-axis direction. The number of virtual antennas forming the MIMO array antennas $A_{MAR\text{-}MIMO2}$ is the same as that of the antennas forming the MIMO array antenna $A_{MRA\text{-}MIMO1}$. As a result, virtual array antennas are formed, and the total size of the virtual array antennas is twice the size of the array antenna $A_{MRA\text{-}MIMO1}$ of the MRA.

FIG. 18 shows an example, as in the first embodiment shown in FIG. 10, using the second transmission antenna module 22e having the transmission antenna At2. The center of the transmission antenna At2 is positioned at coordinates (+Dx, +Dy) which are apart from the center of the first transmission antenna At1 by +Dx in the x-axis direction and +Dy in the y-axis direction. As explained in the first embodiment, instead of the second transmission antenna module 22e, the second transmission antenna module 22f, 22g, or 22h may be used.

When using the second transmission antenna module 22e, a MIMO array antenna $A_{MRA\text{-}MIMO3}$ is formed by copying the MIMO array antenna $A_{MRA\text{-}MIMO1}$ to a region having a center positioned at the second transmission antenna At2. That is, the MIMO array antenna $A_{MRA\text{-}MIMO3}$ is formed in the region having a center positioned at coordinates (+Dx, +Dy) which are apart from the center of the first transmission antenna At1 by +Dx in the x-axis direction and +Dy in the y-axis direction. The center of the second transmission antenna At2 is aligned with the center of the MIMO array antenna $A_{MRA\text{-}MIMO3}$.

The positions of the antennas forming the MIMO array antenna $A_{MAR\text{-}MIMO3}$ respectively correspond to the positions of the antennas forming the MIMO array antenna $A_{MRA\text{-}MIMO1}$. The size of the MIMO array antenna $A_{MAR\text{-}MIMO3}$ is Dx in the x-axis direction and Dy in the y-axis direction is Dy. The number of antennas forming the MIMO array antennas $A_{MAR\text{-}MIMO3}$ is the same as that of the antennas forming the MIMO array antenna $A_{MRA\text{-}MIMO1}$. As a result, the virtual array antennas are formed, and the total size of the virtual array antennas is twice the size of the array antenna $A_{MRA-MIMO1}$ of the MRA.

When using such an array antenna of the MRA, much more virtual array antennas can be formed if the KR transformation is used as in the second embodiment.

FIGS. 17 and 18 show that the MIMO array antenna is formed by combining the reception array antenna of the MRA and two transmission antennas. Note that, as in FIGS. 19 to 21, the KR transformation may further be performed.

Figure 19:
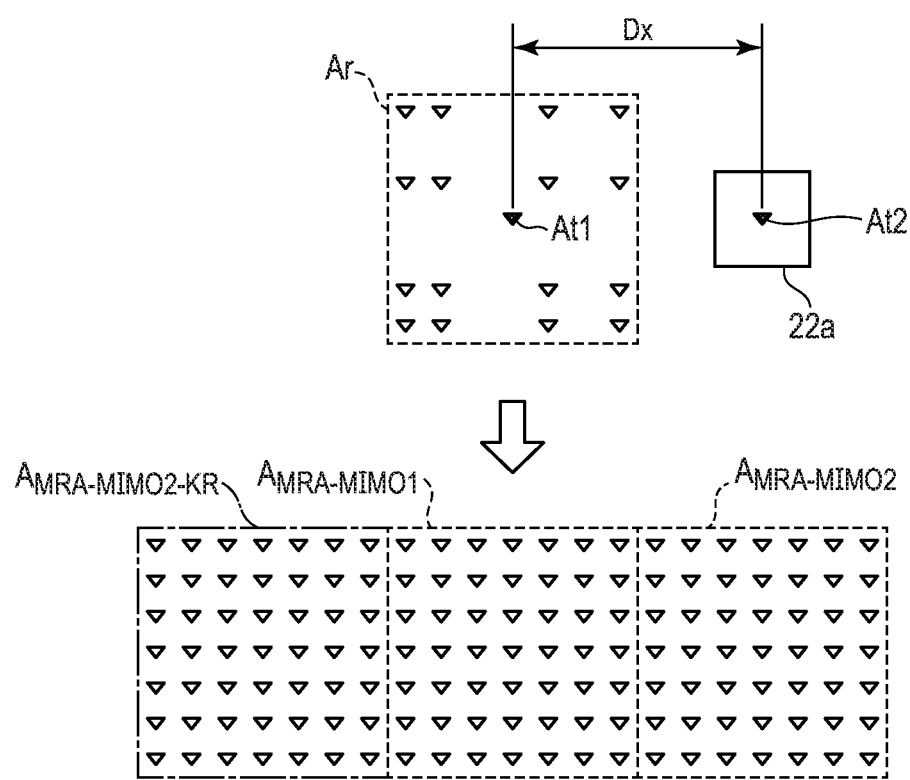
FIG. 19 illustrates another example of the virtual array antenna according to the third embodiment.

FIG. 19 shows an example, as in the second embodiment shown in FIG. 12, using the second transmission antenna module 22a having the transmission antenna At2. The center of the transmission antenna At2 is positioned at coordinates (Dx, 0) which are apart from the center of the first transmission antenna At1 by +Dx in the x-axis direction. In that case, a MIMO array antenna $A_{MRA-MIMO2}$ is formed by copying the MIMO array antenna $A_{MRA-MIMO1}$ (reception antennas) to a region having a center positioned at the second transmission antenna At2. That is, the MIMO array antenna $A_{MRA-MIMO2}$ is formed in the region having a center positioned at coordinates (+Dx, 0) which are apart from the center of the first transmission antenna At1 by +Dx in the x-axis direction. The center of the second transmission antenna At2 is aligned with the center of the MIMO array antenna $A_{MRA-MIMO2}$.

The MIMO-KR transformation virtual array antenna $A_{MRA-MIMO2-KR}$ is formed in a region symmetrical to the MIMO array antenna $A_{MRA-MIMO2}$ with respect to the first transmission antenna At1, that is, a region having a center positioned at coordinates (−Dx, 0) which are apart from the center of the reception array antenna Ar by −Dx in the x-axis direction.

The positions of the antennas forming the MIMO array antennas $A_{MRA-MIMO2}$ and the positions of the virtual antennas forming the MIMO-KR transformation virtual array antenna $A_{MRA-MIMO2-KR}$ respectively correspond to the positions of the reception antennas forming the MRA array antenna $A_{MRA-MIMO1}$. The array size of each of the MIMO array antennas $A_{MRA-MIMO2}$ and the MIMO-KR transformation virtual array antenna $A_{MRA-MIMO2-KR}$ is Dx in the x-axis direction and Dy in the y-axis direction. The number of antennas forming the MIMO array antenna $A_{MRA-MIMO2}$ and the number of virtual antennas forming the MIMO-KR transformation virtual array antenna $A_{MRA-MIMO2-KR}$ are the same as the number of the antennas forming the MRA array antenna $A_{MRA-MIMO1}$. As a result, virtual array antennas are formed, and the total size of the virtual array antennas is third times the size of the MRA array antenna $A_{MRA-MIMO1}$.

Figure 20:
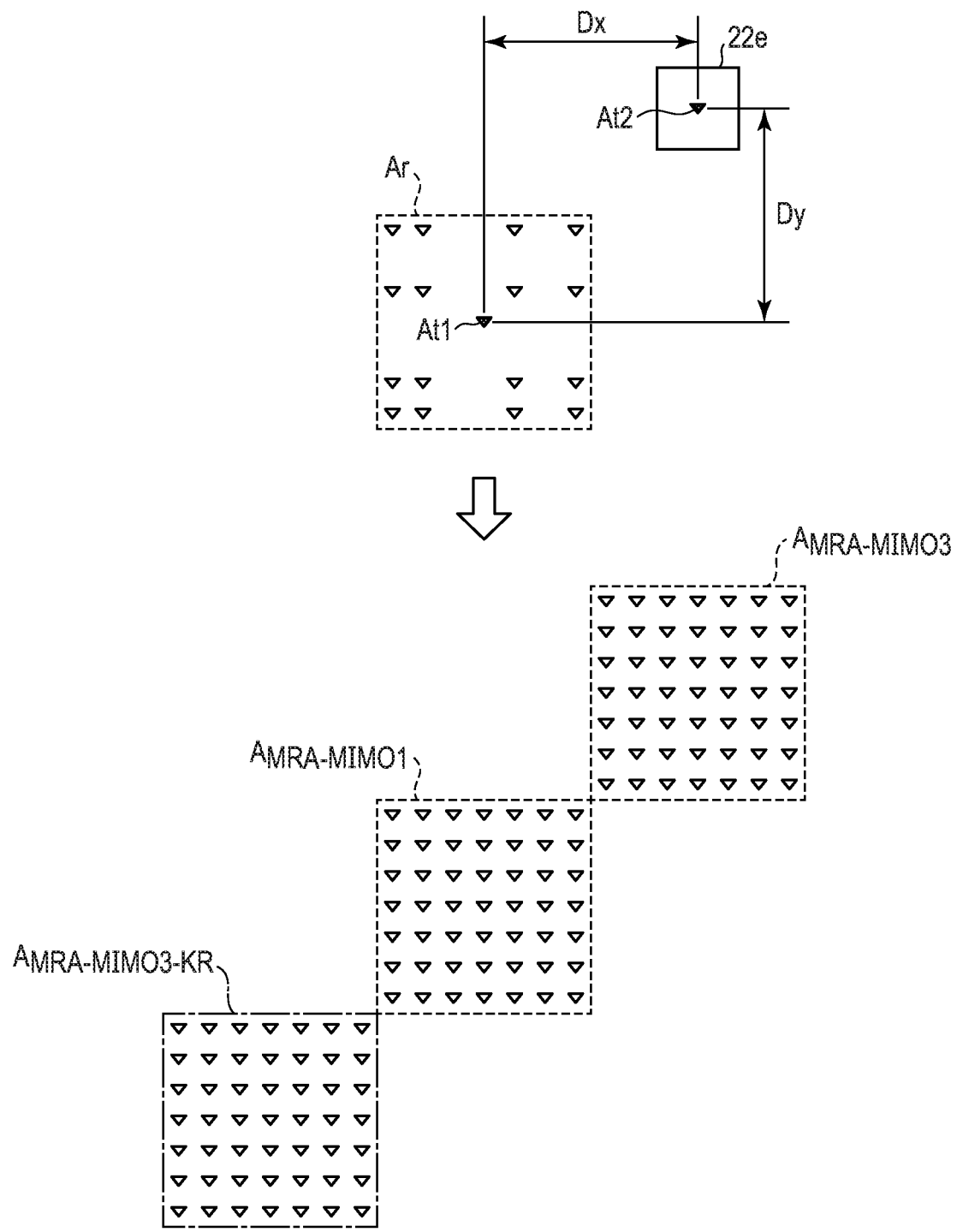
FIG. 20 illustrates another example of the virtual array antenna according to the third embodiment.

FIG. 20 shows an example, as in the second embodiment shown in FIG. 13, using the second transmission antenna module 22e having the transmission antenna At2. The center of the transmission antenna At2 is positioned at coordinates (+Dx, +Dy) which are apart from the center of the transmission antenna At1 by +Dx in the x-axis direction and +Dy in the y-axis direction. In that case, a MIMO array antenna $A_{MRA-MIMO3}$ is formed, as in the first and second embodiment, by copying the MRA array antenna $A_{MRA-MIMO1}$ (reception antennas) to a region having a center positioned at the second transmission antenna At2. The center of the second transmission antenna At2 is aligned with the center of the MIMO array antenna $A_{MRA-MIMO3}$.

The MIMO-KR transformation virtual array antenna $A_{MRA-MIMO3-KR}$ is formed in a region symmetrical to the MIMO array antenna $A_{MRA-MIMO3}$ with respect to the first transmission antenna At1, that is, a region having a center positioned at coordinates (−Dx, −Dy) which are apart from the center of the reception array antenna Ar by −Dx in the x-axis direction and −Dy in the y-axis direction.

The positions of the antennas forming the MIMO array antennas $A_{MRA-MIMO3}$ and the positions of the virtual antennas forming the MIMO-KR transformation virtual array antenna $A_{MRA-MIMO3-KR}$ respectively correspond to the positions of the reception antennas forming the MIMO array antenna $A_{MRA-MIMO1}$. The array size of the MIMO array antennas $A_{MRA-MIMO3}$ and the array size of the MIMO-KR transformation virtual array antenna $A_{MRA-MIMO3-KR}$ is Dx in the x-axis direction and Dy in the y-axis direction. The number of antennas forming the MIMO array antenna $A_{MRA-MIMO3}$ and the number of virtual antennas forming the MIMO-KR transformation virtual array antenna $A_{MRA-MIMO3-KR}$ are the same as the number of reception antennas forming the MRA array antenna $A_{MRA-MIMO1}$. As a result, virtual array antennas are formed, and the total size of the virtual array antennas is three times the size of the MIMO array antenna $A_{MRA-MIMO1}$.

Figure 21:
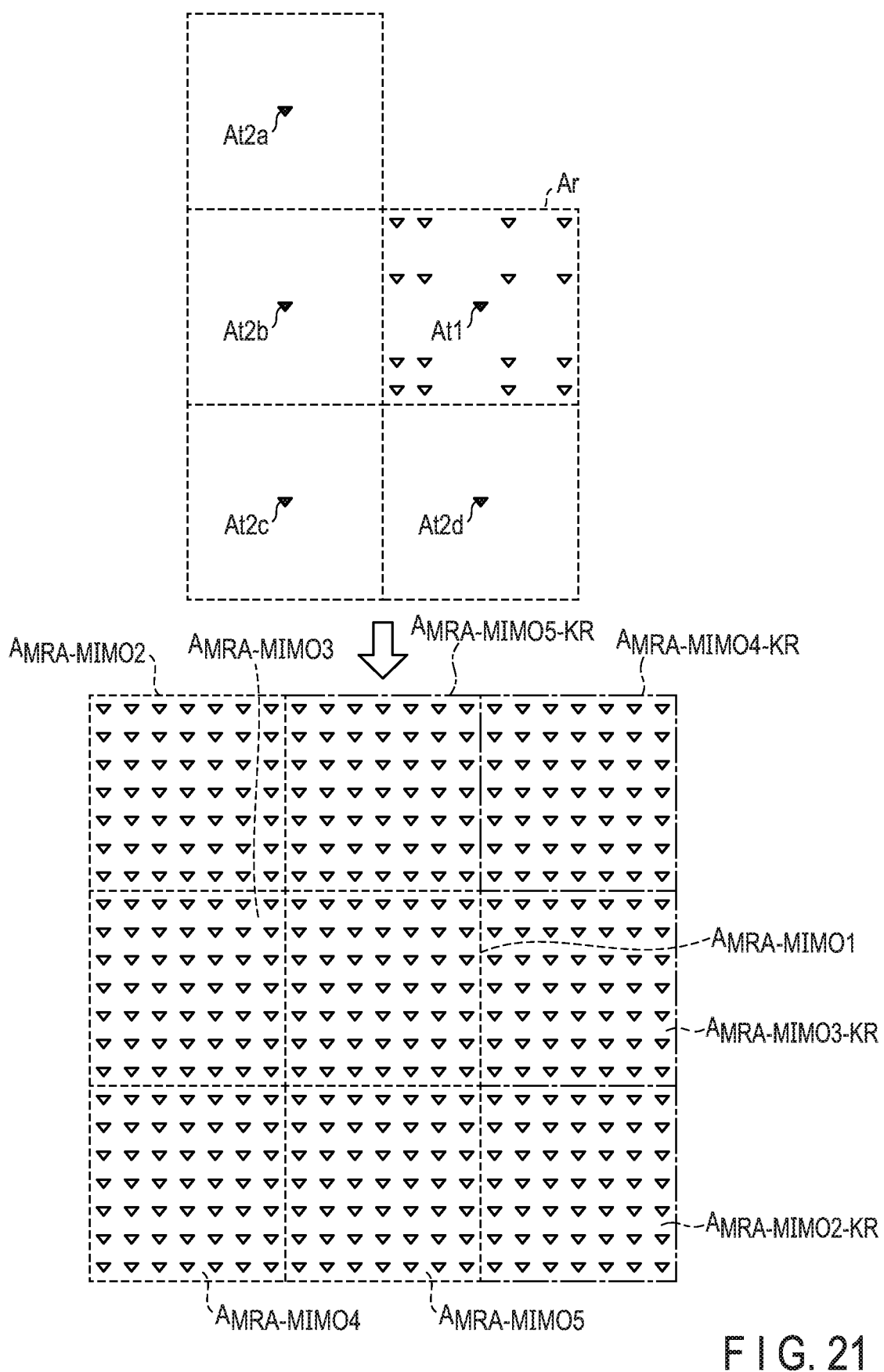
FIG. 21 illustrates another example of the virtual array antenna according to the third embodiment.

FIG. 21 shows an example in which four second transmission antennas At2a to At2d are used as in the second embodiment of FIG. 14. The center of the second transmission antenna At2a is at coordinates (−Dx, +Dy) which are apart from the center of the transmission antenna At1 by −Dx in the x-axis direction and +Dy in the y-axis direction. The center of the second transmission antenna At2b is at coordinates (−Dx, 0) which are apart from the center of the transmission antenna At1 by −Dx in the x-axis direction. The center of the second transmission antenna At2c is at coordinates (−Dx, −Dy) which are apart from the center of the transmission antenna At1 by −Dx in the x-axis direction and −Dy in the y-axis direction. The center of the second transmission antenna At2d is at coordinates (0, −Dy) which are apart from the center of the transmission antenna At1 by −Dy in the y-axis direction.

In this case, four MIMO array antennas $A_{MRA-MIMO2}$ to $A_{MRA-MIMO5}$ with four second transmission antennas At2 are, as in the first and second embodiments, in the regions around the second transmission antenna At2. That is, the MIMO array antenna $A_{MRA-MIMO2}$ is formed in a region having a center positioned at coordinates (Dx, −Dy) which are apart from the center of the reception array antenna Ar by Dx in the x-axis direction and −Dy in the y-axis direction. The MIMO array antenna $A_{MRA-MIMO3}$ is formed in a region having a center positioned at coordinates (−Dx, 0) which are apart from the center of the reception array antenna Ar by −Dx in the x-axis direction. The MIMO array antenna $A_{MRA-MIMO4}$ is formed in a region having a center positioned at coordinates (−Dx, −Dy) which are apart from the center of the reception array antenna Ar by −Dx in the x-axis direction and −Dy in the y-axis direction. The MIMO array antenna $A_{MRA-MIMO5}$ is formed in a region having a center positioned at coordinates (0, −Dy) which are apart from the center of the reception array antenna Ar by −Dy in the y-axis direction.

MIMO-KR transformation virtual array antennas $A_{MRA-MIMO2-KR}$ to $A_{MRA-MIMO5-KR}$ are respectively formed in the regions symmetrical to the MIMO virtual array antennas $A_{MRA-MIMO2}$ to $A_{MRA-MIMO5}$ with respect to the first transmission antenna At1. That is, the MIMO-KR transformation virtual array antenna $A_{MRA-MIMO2-KR}$ is formed in a region having a center positioned at coordinates (+Dx, −Dy) which are apart from the center of the reception array antenna Ar by +Dx in the x-axis direction and −Dy in the y-axis direction. The MIMO-KR transformation virtual array antenna $A_{MRA-MIMO3-KR}$ is formed in a region having a center positioned at coordinates (+Dx, 0) which are apart from the center of the reception array antenna Ar by +Dx in the x-axis direction. The MIMO-KR transformation virtual array antenna $A_{MRA\text{-}MIMO4\text{-}KR}$ is formed in a region having a center positioned at coordinates (+Dx, +Dy) which are apart from the center of the reception array antenna Ar by +Dx in the x-axis direction and +Dy in the y-axis direction. The MIMO-KR transformation virtual array antenna $A_{MRA\text{-}MIMO5\text{-}KR}$ is formed in a region having a center positioned at coordinates (0, +Dy) which are apart from the center of the reception array antenna Ar by +Dy in the y-axis direction.

Thus, as in the first and second embodiments, the MIMO array antennas $A_{MRA\text{-}MIMO2}$ to $A_{MRA\text{-}MIMO5}$ and the MIMO-KR transformation array antennas $A_{MRA\text{-}MIMO2\text{-}KR}$ to $A_{MRA\text{-}MIMO5\text{-}KR}$ are formed in eight regions around the reception array antenna Ar at maximum.

Thus, as in the second embodiment, according to the third embodiment, the second transmission antenna At2 is disposed in one of the two regions that are symmetrical with respect to the antenna At1. A MIMO array antenna $A_{MRA\text{-}MIMO}$ is formed in the region of the second transmission antenna At2, and the MIMO-KR transformation array antenna $A_{MRA\text{-}MIMO\text{-}KR}$ is formed in a region symmetrical to the second transmission antenna At2 with respect to the first transmission antenna At1. By performing the KR transformation to the MIMO array antenna $A_{MRA\text{-}MIMO}$, the array antenna can be formed efficiently.

According to the third embodiment, since the reception array antenna of the MRA is used instead of the reception array antenna of the URA of the first and second embodiments, the virtual array antenna can be formed more efficiently.

Fourth Embodiment

According to the third embodiment, the reception array antenna includes an array antenna of the MRA, but in the fourth embodiment, the transmission array antenna includes an array antenna of the MRA.

FIG. 22 shows an example of a MIMO array antenna including a reception array antenna Ar of the URA and a transmission array antenna At of the MRA. The reception array antenna Ar includes 4×4 reception antennas arranged at regular intervals. The transmission array antenna At includes 3×3 transmission antennas Ata to Ati arranged at irregular intervals. The number of antennas forming the reception array antenna Ar and the number of antennas forming the transmission array antenna At may be more than the number shown in the figure. The center of the reception array antenna Ar and any of the four corners of the transmission array antenna At, for example, the center of the antenna Ata in the lower left corner are aligned, and the point of alignment is the origin (0, 0) of the x-y coordinates. The array sizes of the reception array antennas Ar are Lx and Ly.

The center of the transmission antenna Ata is located at coordinates (0, 0). The center of the transmission antenna Atb is located at coordinates (Lx, 0). The center of the transmission antenna Atc is located at coordinates (3Lx, 0). The center of the transmission antenna Atd is located at coordinates (0, Ly). The center of the transmission antenna Ate is located at coordinates (Lx, Ly). The center of the transmission antenna Atf is located at coordinates (3Lx, Ly). The center of the transmission antenna Atg is located at coordinates (0, 3Ly). The center of the transmission antenna Ath is located at coordinates (Lx, 3Ly). The center of the transmission antenna Ati is located at coordinates (3Lx, 3Ly).

The intervals between the transmission antennas in the x-axis direction are set to Lx and 2Lx, and the intervals between transmission antennas in the y-axis direction are set to Ly and 2Ly. The array sizes Dx and Dy of the transmission array antenna At of the MRA in the x-axis direction and y-axis direction will be expressed as follows based on the sum of the intervals plus Lx(Ly).

$$Dx=(Lx+2Lx)+Lx=4Lx \qquad \text{Equation 14}$$

$$Dy=(Ly+2Ly)+Ly=4Ly \qquad \text{Equation 15}$$

When transmission/reception are performed by the reception array antenna Ar and the transmission array antenna At, sixteen MIMO array antennas $A_{MRA\text{-}MIMO}$ each including 4×4 antennas are formed. The sixteen MIMO array antennas $A_{MRA\text{-}MIMO}$ are formed in a region having a center positioned at coordinates (0, 0), region having a center positioned at coordinates (+Lx, 0), region having a center positioned at coordinates (+2Lx, 0), region having a center positioned at coordinates (+3Lx, 0), region having a center positioned at coordinates (0, +Ly), region having a center positioned at coordinates (+Lx, +Ly), region having a center positioned at coordinates (+2Lx, +Ly), region having a center positioned at coordinates (+3Lx, +Ly), region having a center positioned at coordinates (0, +2Ly), region having a center positioned at coordinates (+Lx, +2Ly), region having a center positioned at coordinates (+2Lx, +2Ly), region having a center positioned at coordinates (+3Lx, +2Ly), region having a center positioned at coordinates (0, +3Ly), region having a center positioned at coordinates (+Lx, +3Ly), region having a center positioned at coordinates (+2Lx, +3Ly), and region having a center positioned at coordinates (+3Lx, +3Ly), respectively.

Although not shown, when the KR transformation is performed, fifteen more MIMO-KR transformation virtual array antennas $A_{MRA\text{-}MIMO\text{-}KR}$ are formed. The fifteen MIMO-KR transformation virtual array antennas $A_{MRA\text{-}MIMO\text{-}KR}$ are formed in a region having a center positioned at coordinates (−Lx, 0), region having a center positioned at coordinates (−2Lx, 0), region having a center positioned at coordinates (−3Lx, 0), region having a center positioned at coordinates (0, −Ly), region having a center positioned at coordinates (−Lx, −Ly), region having a center positioned at coordinates (−2Lx, −Ly), region having a center positioned at coordinates (−3Lx, −Ly), region having a center positioned at coordinates (−0, −2Ly), region having a center positioned at coordinates (−Lx, −2Ly), region having a center positioned at coordinates (−2Lx, −2Ly), region having a center positioned at coordinates (−3Lx, −2Ly), region having a center positioned at coordinates (−0, −3Ly), region having a center positioned at coordinates (−Lx, −3Ly), region having a center positioned at coordinates (−2Lx, −3Ly), and region having a center positioned at coordinates (−3Lx, −3Ly), respectively.

Fifth Embodiment

In the fifth embodiment, the reception array antenna of the URA of the fourth embodiment includes an array antenna of the MRA.

Figure 23:
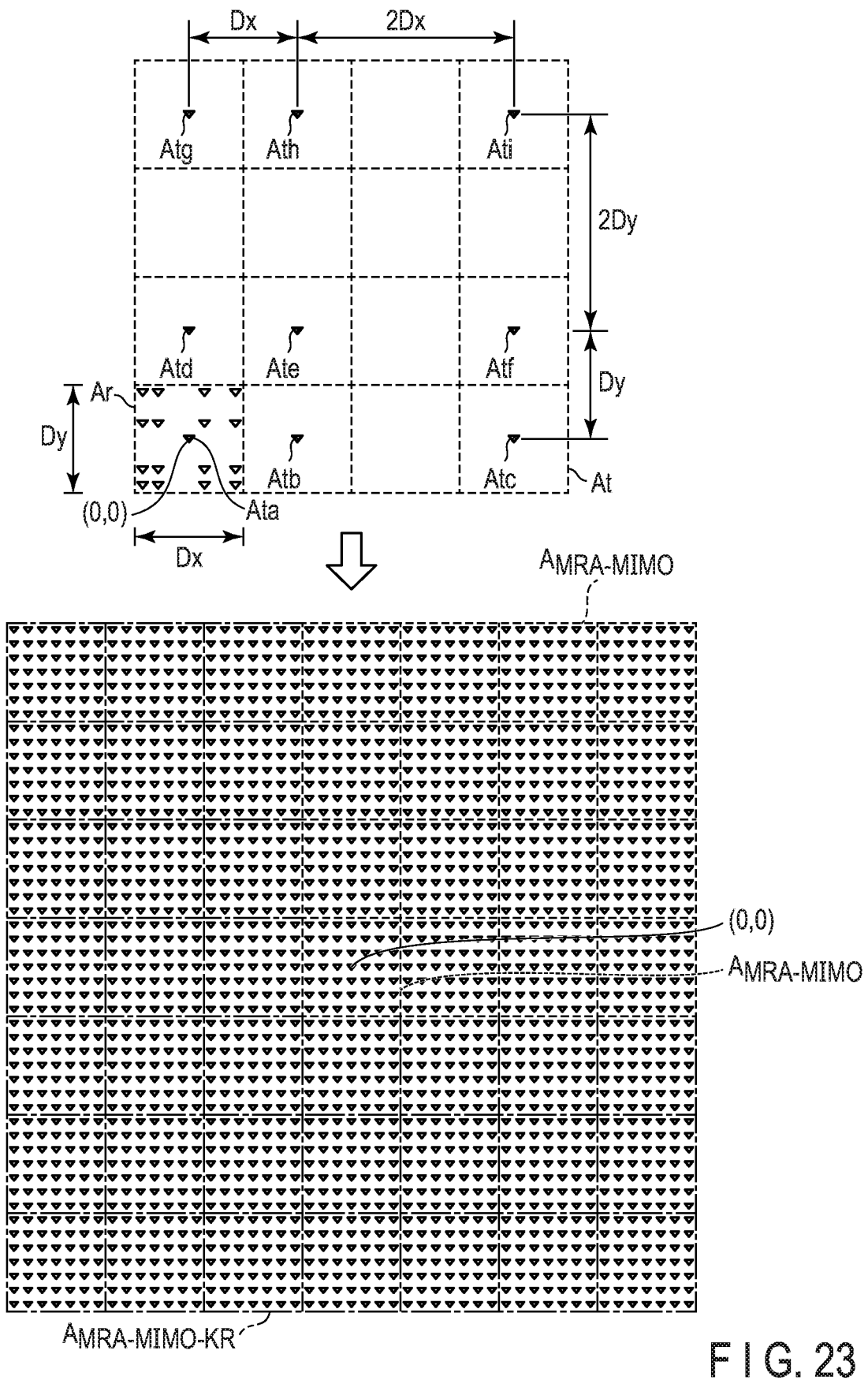
FIG. 23 illustrates an example of a virtual array antenna according to a fifth embodiment.

FIG. 23 shows an example of an array antenna including a reception array antenna Ar of the MRA and a transmission array antenna At of the MRA. The reception array antenna Ar includes 4×4 reception antennas arranged at irregular intervals as in the third embodiment shown in FIG. 16. The array sizes Dx and Dy of the reception array antenna Ar are $7\Delta x$ and $7\Delta y$. The number of antennas forming the reception array antenna Ar and the number of antennas forming the transmission array antenna At may be more than the number shown in the figure. Here, the center of the reception array antenna Ar and any of the four corners of the transmission array antenna At, for example, the center of the antenna Ata in the lower left corner are, aligned, and the point of alignment is the origin (0, 0) of the x-y coordinates. The array sizes of the transmission array antenna At are 4Dx and 4Dy.

Sixteen MIMO array antennas $A_{MRA\text{-}MIMO}$ in Dx×Dy are formed in a region having a center positioned at coordinates (0, 0), region having a center positioned at coordinates (+Dx, 0), region having a center positioned at coordinates (+2Dx, 0), region having a center positioned at coordinates (+3Dx, 0), region having a center positioned at coordinates (0, +Dy), region having a center positioned at coordinates (+Dx, +Dy), region having a center positioned at coordinates (+2Dx, +Dy), region having a center positioned at coordinates (+3Dx, +Dy), region having a center positioned at coordinates (0, +2Dy), region having a center positioned at coordinates (+Dx, +2Dy), region having a center positioned at coordinates (+2Dx, +2Dy), region having a center positioned at coordinates (+3Dx, +2Dy), region having a center positioned at coordinates (0, +3Dy), region having a center positioned at coordinates (+Dx, +3Dy), region having a center positioned at coordinates (+2Dx, +3Dy), and region having a center positioned at coordinates (+3Dx, +3Dy), respectively.

In addition, through the KR transformation, thirty three MIMO-KR transformation virtual array antennas $A_{MRA\text{-}MIMO\text{-}KR}$ of Dx×Dy are formed in a region having a center positioned at coordinates (+3Dx, −3Dy), region having a center positioned at coordinates (+2Dx, −3Dy), region having a center positioned at coordinates (+Dx, −3Dy), region having a center positioned at coordinates (0, −3Dy), region having a center positioned at coordinates (−Dx, −3Dy), region having a center positioned at coordinates (−2Dx, −3Dy), region having a center positioned at coordinates (−3Dx, −3Dy), region having a center positioned at coordinates (+3Dx, −2Dy), region having a center positioned at coordinates (+2Dx, −2Dy), region having a center positioned at coordinates (+Dx, −2Dy), region having a center positioned at coordinates (0, −2Dy), region having a center positioned at coordinates (−Dx, −2Dy), region having a center positioned at coordinates (−2Dx, −2Dy), region having a center positioned at coordinates (−3Dx, −2Dy), region having a center positioned at coordinates (+3Dx, −Dy), region having a center positioned at coordinates (+2Dx, −Dy), region having a center positioned at coordinates (+Dx, −Dy), region having a center positioned at coordinates (0, −Dy), region having a center positioned at coordinates (−Dx, −Dy), region having a center positioned at coordinates (−2Dx, −Dy), region having a center positioned at coordinates (−3Dx, −Dy), region having a center positioned at coordinates (−Dx, 0), region having a center positioned at coordinates (−2Dx, 0), region having a center positioned at coordinates (−3Dx, 0), region having a center positioned at coordinates (−Dx, +Dy), region having a center positioned at coordinates (−2Dx, +Dy), region having a center positioned at coordinates (−3Dx, +Dy), region having a center positioned at coordinates (−Dx, +2Dy), region having a center positioned at coordinates (−2Dx, +2Dy), region having a center positioned at coordinates (−3Dx, +2Dy), region having a center positioned at coordinates (−Dx, +3Dy), region having a center positioned at coordinates (−2Dx, +3Dy), and region having a center positioned at coordinates (−3Dx, +3Dy), respectively.

Application Example

An electronic apparatus uses radio waves to generate an image of a target. Radio waves with wavelengths between 1 mm and 10 mm are called millimeter waves (EHF: Extra High Frequency). Radio waves with wavelengths from 10 mm to 100 mm are called microwaves (SHF: Super High Frequency). When using millimeter waves, the distance between the antennas that form the array antenna is a few millimeters (e.g., 2 millimeter or less). When using millimeter waves, a large number of antennas are needed because the antenna interval is small. Therefore, it is preferable to use a MIMO array antenna.

The antenna device according to the above-described embodiments can be applied to such an electronic apparatus. FIG. 24 illustrates an application of the antenna device according to the above-described embodiments. The electronic apparatus includes an array antenna 114 that is positioned opposed to a target (e.g., a person) 126, a detection device 112 connected to the array antenna 114, and a display device 118 connected to the detection device 112. The array antenna 114 includes the transmission antenna and the reception antenna according to the embodiments. The size of the array antenna 114 corresponds to the size of the target 126. Radio waves are irradiated from the array antenna 114 in the Z-axis direction orthogonal to the antenna substrate.

The detection device 112 obtains an image of the target 126 in a plane 124 which is in a three-dimensional space 122 located in the direction of the radio waves irradiated from the array antenna 114. The plane 124 is parallel to the array antenna 114. The phase of the plane 124 from which the image is obtained depends on the time from transmission to reception of the radio waves. The time from transmission to reception of the radio waves is set according to the phase of a number of planes 124 in the three-dimensional space 122. By obtaining images of the planes 124 at a number of different locations, a 3-D image of the target 126 can be rendered. One example of the use of this detection device 112 is body checking of persons at airports, train stations, etc.

The detection device 112 includes a transmitter 132 and a receiver 134 connected to each antenna included in the array antenna 114. The transmitters 132 or the receivers 134 may be provided corresponding to the number of the antennas, and may be connected to the antennas, respectively. The transmitters 132 or the receivers 134 may be provided to be less than the number of the antennas, and may be connected commonly to the antennas via a selector.

The transmitter 132 and the receiver 134 are controlled by a controller 140. The transmitter 132 and the receiver 134 are connected to the controller 140 by wire or wirelessly. The controller 140 controls a transmission frequency, frequency band, and transmission timing for each antenna of the transmitter 132, and controls a reception timing (time from transmission to reception) of the receiver 134 for each antenna. The reception signal of one antenna corresponds to the image signal of one pixel of the target 126. The controller 140 changes (scans) the antennas sequentially, and changes the reception timing. The radio waves irradiated from the transmission antenna and reflected at the target 126 are received by the reception antenna.

The reception signal output from the receiver 134 is supplied to an image generation circuit 136, and an image signal indicative of a 3-D image of the target 126 is generated. The receiver 134 and the image generation circuit 136 are connected by wire or wirelessly. The image generation circuit 136 is also controlled by the controller 140. The image reconstruction algorithm of the image generation circuit 136 may be a time domain method, frequency domain method, or any other algorithms.

The image signal generated by the image generation circuit 136 is supplied to the display device 118 for display. By observing this image, whether or not the target 126 possesses a dangerous object (e.g., a gun) 128 can be detected. The image generation circuit 136 and the display device 118 are connected by wire or wireless.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Note that the lengths and distances described herein may be deviated therefrom within 10% in consideration of a manufacturing error or the like.

For example, in the description above, the array antenna is structured by arranging the antennas in a two-dimensional manner. However, an area array antenna may be structured by scanning a linear array antenna arranged in a one-dimensional manner in a direction orthogonal to the alignment direction of the antennas. For example, when a linear array antenna formed of the reception antennas arranged in a one-dimensional manner in the x-axis direction at intervals $\Delta x$ scans an area Ly with a pitch $\Delta y$ in the y-axis direction, the reception signal equivalent to the reception signal of the reception array antenna Ar shown in FIG. 6 is obtained. The antennas forming the array antenna are arranged in the x-axis direction and y-axis direction orthogonal to each other, and they may be arranged in two axial directions that intersect at angles other than 90 degrees.

What is claimed is:

1. A radar apparatus comprising:
   first antennas arranged in a first plane;
   a second antenna;
   a third antenna; and
   a processor,
   wherein:
   if the first antennas are used as transmission antennas, the second antenna and the third antenna are used as reception antennas,
   if the second antenna and the third antenna are used as the transmission antennas, the first antennas are used as the reception antennas,
   the first antennas are arranged in a first direction at a first distance and in a second direction at a second distance, the second direction crossing the first direction,
   a distance between the second antenna and the third antenna in the first direction is approximately equal to a product of the first distance and a number of first antennas arranged in the first direction,
   a center of the first antennas is approximately same as a center of the second antenna,
   the processor is configured to calculate fourth transmission signals of virtual antennas from first transmission signals of the first antennas, second transmission signals of the second antenna, and third transmission signals of the third antenna, or calculate fourth reception signals of the virtual antennas from first reception signals of the first antennas, second reception signals of the second antenna, and third reception signals of the third antenna,
   a center of the virtual antennas is approximately same as a center of the third antenna, and
   the virtual antennas are respectively at positions corresponding to the first antennas.

2. A radar apparatus comprising:
   first antennas arranged in a first plane;
   a second antenna; and
   a third antenna,
   wherein:
   if the first antennas are used as transmission antennas, the second antenna and the third antenna are used as reception antennas,
   if the second antenna and the third antenna are used as the transmission antennas, the first antennas are used as the reception antennas,
   the first antennas are arranged in a first direction at a first distance and in a second direction at a second distance, the second direction crossing the first direction,
   a distance between the second antenna and the third antenna in the first direction is approximately equal to a product of the first distance and a number of first antennas arranged in the first direction,
   a center of the first antennas is approximately same as a center of the second antenna,
   the third antenna comprises antenna elements, at least two of the antenna elements being asymmetrical with respect to the center of the second antenna,
   there is no transmission antenna provided between the second antenna and the third antenna if the second antenna and the third antenna are used as the transmission antennas, and
   there is no reception antenna provided between the second antenna and the third antenna if the second antenna and the third antenna as used as the reception antennas.

3. The radar apparatus of claim 2, wherein the second direction is orthogonal to the first direction.

4. The radar apparatus of claim 2, wherein the first distance and the second distance are an approximately half-wavelength of a highest intensity wave contained in radio waves irradiated from the transmission antennas.

5. A radar apparatus comprising:
   first antennas arranged in a first plane;
   a second antenna;
   a third antenna; and
   a processor,
   wherein:
   if the first antennas are used as transmission antennas, the second antenna and the third antenna are used as reception antennas,
   if the second antenna and the third antenna are used as the transmission antennas, the first antennas are used as the reception antennas,
   the first antennas are arranged in a first direction at a first distance and in a second direction at a second distance, the second direction crossing the first direction,
   a distance between the second antenna and the third antenna in the first direction is approximately equal to a product of the first distance and a number of first antennas arranged in the first direction,
   the processor is configured to calculate fourth transmission signals of first virtual antennas and fifth transmission signals of second virtual antennas from first transmission signals of the first antennas, second transmission signals of the second antenna, and third transmission signals of the third antenna, or calculate fourth reception signals of the first virtual antennas and fifth reception signals of the second virtual antennas from first reception signals of the first antennas, second reception signals of the second antenna, and third reception signals of the third antenna, a center of the first virtual antennas is approximately same as a center of the third antenna, the first virtual antennas are respectively at positions corresponding to the first antennas, a center of the second virtual antennas is symmetrical to the third antenna with respect to the second antenna, and the second virtual antennas are respectively at positions corresponding to the first antennas.

6. A radar apparatus comprising:

first antennas arranged in a first plane and configured to form a minimum redundancy array;

a second antenna; and a processor, wherein:

if the first antennas are used as transmission antennas, the second antenna is used as a reception antenna, if the second antenna is used as a transmission antenna, the first antennas are used as reception antennas, the first antennas are arranged in a first direction and in a second direction crossing the first direction, distances between respective adjacent pairs of the first antennas arranged in the first direction are not the same, the distances including a third distance which is a minimum distance between an adjacent pair of the first antennas arranged in the first direction, and a positive integer multiple of the third distance, distances between respective adjacent pairs of the first antennas arranged in the second direction are not the same, the distances including a fourth distance which is a minimum distance between an adjacent pair of the first antennas arranged in the second direction, and a positive integer multiple of the fourth distance, and the processor is configured to calculate third reception signals of first virtual antennas arranged in the first direction at the third distance and in the second direction at the fourth distance from first reception signals of the first antennas and second reception signals of the second antenna.

7. The radar apparatus of claim 6, further comprising:

a third antenna, wherein:

if the first antennas are used as the transmission antennas, the second antenna and the third antenna are used as the reception antennas, if the second antenna and the third antenna are used as the transmission antennas, the first antennas are used as the reception antennas, and a distance between the second antenna and the third antenna in the first direction is approximately equal to an array size of the minimum redundancy array in the first direction.

8. The radar apparatus of claim 7, wherein:

the processor is configured to calculate fourth reception signals of second virtual antennas and fifth reception signals of third virtual antennas from the first reception signals of the first antennas, the second reception signals of the second antenna, and third reception signals of the third antenna to, the second virtual antennas are in a first quadrilateral region defined by the array size of the minimum redundancy array, a center of the first quadrilateral region is approximately same as a center of the third antenna, the third virtual antennas are in a second quadrilateral region defined by the array size of the minimum redundancy area, a center of the second quadrilateral region is symmetrical to the center of the first quadrilateral region with respect to the second antenna, and the third virtual antennas are respectively at positions corresponding to the second virtual antennas.

9. The radar apparatus of claim 7, wherein the third antenna is arranged at one of two points which are symmetrical with respect to the second antenna.

10. The radar apparatus of claim 6, wherein the second direction is orthogonal to the first direction.

11. The radar apparatus of claim 6, wherein the third distance and the fourth distance are an approximately half-wavelength.

12. A radar apparatus, comprising:

first antennas arranged in a first plane;

second antennas arranged in a second plane; and a processor configured to calculate reception signals of a first number of antennas from reception signals of the first and second antennas, wherein:

if the first antennas are used as transmission antennas, the second antennas are used as reception antennas, if the second antennas are used as the transmission antennas, the first antennas are used as the reception antennas, the first plane and the second plane are included in a single plane or two planes parallel to each other, the first antennas are arranged in a first quadrilateral region defined by a first size in a first direction and a second size in a second direction, the second antennas are arranged in the first direction at a first distance and a second distance and in the second direction at a third distance and a fourth distance, the first distance is the first size, the second distance includes a distance of a positive integer multiple of the first distance, the third distance is the second size, the fourth distance includes a distance of a positive integer multiple of the third distance, and the first number is approximately equal to a number of the first antennas included in second quadrilateral areas respectively including the second antennas and defined by the first size and the second size.

13. The radar apparatus of claim 12, wherein the first antennas are arranged in the first direction at a fifth distance and in the second direction at a sixth distance.

14. The radar apparatus of claim 12, wherein the second direction is orthogonal to the first direction.

15. A radar apparatus, comprising:

first antennas arranged in a first plane; and second antennas arranged in a second plane, wherein:

if the first antennas are used as transmission antennas, the second antennas are used as reception antennas, if the second antennas are used as the transmission antennas, the first antennas are used as the reception antennas, the first plane and the second plane are included in a single plane or two planes parallel to each other, the first antennas are arranged in a first quadrilateral region defined by a first size in a first direction and a second size in a second direction, the second antennas are arranged in the first direction at a first distance and a second distance and in the second direction at a third distance and a fourth distance, the first distance is the first size, the second distance includes a distance of a positive integer multiple of the first distance, the third distance is the second size, the fourth distance includes a distance of a positive integer multiple of the third distance, the first antennas are arranged in the first direction at a seventh distance and an eighth distance and in the second direction at a ninth distance and a tenth distance, the eighth distance includes a positive integer multiple of the seventh distance, and the tenth distance includes a positive integer multiple of the ninth distance.

16. The radar apparatus of claim 15, wherein the seventh distance and the ninth distance are an approximately half-wavelength.

17. A transmission and reception method with a radar apparatus, the radar apparatus comprising first antennas arranged in a first plane, a second antenna arranged in a second plane, and a third antenna arranged in a third plane, the first plane, the second plane, and the third plane being included in a single plane or two planes which are parallel to each other, the first antennas being arranged within a first quadrilateral region defined by a first size in a first direction and a second size in a second direction, and being arranged in the first direction at a first distance and in the second direction at a second distance, a distance between the second antenna and the third antenna in the first direction being approximately equal to the first size, a center of the first antenna being approximately same as a center of the second antenna, and the method comprising:

transmitting radio waves by the first antennas and receiving radio waves by the second antenna and the third antenna;

transmitting radio waves by the second antenna and the third antenna and receiving radio waves by the first antennas; and calculating fourth transmission signals of virtual antennas from first transmission signals of the first antennas, second transmission signals of the second antenna, and third transmission signals of the third antenna, or calculating fourth reception signals of the virtual antennas from first reception signals of the first antennas, second reception signals of the second antenna, and third reception signals of the third antenna, wherein:

a center of the virtual antennas is approximately same as a center of the third antenna, and the virtual antennas are respectively at positions corresponding to the first antennas.

18. A transmission and reception method with a radar apparatus, the radar apparatus comprising first antennas arranged in a first plane and second antennas arranged in a second plane, the first plane and the second plane being included in a single plane or two planes parallel to each other, the first antennas being arranged in a first quadrilateral region defined by a first size in a first direction and a second size in a second direction, the second antennas being arranged in the first direction at a first distance and a second distance and in the second direction at a third distance and a fourth distance, the first distance being the first size, the second distance including a distance of a positive integer multiple of the first distance, the third distance being the second size, the fourth distance including a distance of a positive integer multiple of the third distance, and the method comprising:

transmitting radio waves by the first antennas and receiving radio waves by the second antennas;

transmitting radio waves by the second antennas and receiving radio waves by the first antennas; and calculating reception signals of a first number of antennas from reception signals of the first and second antennas, the first number being approximately equal to a number of the first antennas included in second quadrilateral areas respectively including the second antennas and defined by the first size and the second size.

* * * * *